(12) United States Patent
Park et al.

(10) Patent No.: US 9,400,599 B2
(45) Date of Patent: Jul. 26, 2016

(54) METHOD FOR CHANGING OBJECT POSITION AND ELECTRONIC DEVICE THEREOF

(71) Applicant: Samsung Electronics Co., Ltd., Gyeonggi-do (KR)

(72) Inventors: Ji-Hea Park, Seoul (KR); Sang-Sup Kim, Gyeonggi-do (KR); Se-Jun Song, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 120 days.

(21) Appl. No.: 13/973,325

(22) Filed: Aug. 22, 2013

(65) Prior Publication Data

US 2014/0062925 A1    Mar. 6, 2014

(30) Foreign Application Priority Data

Sep. 5, 2012   (KR) .......................... 10-2012-0098065

(51) Int. Cl.
    *G06F 3/0486*    (2013.01)
    *G06F 3/041*     (2006.01)
    *G06F 3/0488*    (2013.01)

(52) U.S. Cl.
    CPC ............ *G06F 3/0486* (2013.01); *G06F 3/0412* (2013.01); *G06F 3/04883* (2013.01)

(58) Field of Classification Search
    CPC .................. G06F 3/041–3/047; G06F 3/0482; G06F 3/04845; G06F 3/0485; G06F 3/04855
    USPC .......... 345/173–178; 178/18.01–18.09, 18.11
    See application file for complete search history.

(56) References Cited

U.S. PATENT DOCUMENTS

| | | | |
|---|---|---|---|
| 2002/0163543 A1* | 11/2002 | Oshikiri ........................ | 345/810 |
| 2004/0100479 A1* | 5/2004 | Nakano et al. ................ | 345/700 |
| 2006/0007174 A1* | 1/2006 | Shen ............................. | 345/173 |
| 2008/0168478 A1* | 7/2008 | Platzer et al. ................. | 719/328 |
| 2009/0079699 A1* | 3/2009 | Sun .............................. | 345/173 |
| 2009/0153288 A1 | 6/2009 | Hope et al. | |
| 2009/0287531 A1* | 11/2009 | Yang et al. ....................... | 705/9 |
| 2009/0315848 A1 | 12/2009 | Ku et al. | |
| 2010/0023858 A1* | 1/2010 | Ryu et al. ...................... | 715/702 |
| 2010/0295805 A1 | 11/2010 | Shin et al. | |

(Continued)

FOREIGN PATENT DOCUMENTS

| | | |
|---|---|---|
| EP | 2 413 226 A2 | 2/2012 |
| EP | 2 426 590 A1 | 3/2012 |

(Continued)

OTHER PUBLICATIONS

"Ergonomic requirements for office work with visual display terminals (VDTs)—Part 12: Presentation of information", International Organization for Standardization, First Edition, Dec. 1, 1998, Switzerland.

*Primary Examiner* — Stephen Sherman
(74) *Attorney, Agent, or Firm* — Cha & Reiter, LLC

(57) ABSTRACT

An apparatus and a method for editing an object in an electronic device are provided. In the method, when a first event occurs depending on detected touch information of at least one object among a plurality of objects displayed on a display unit, a movement interval is determined depending on a characteristic of the first event. A position of the at least one object is changed depending on a movement interval corresponding to the characteristic of the first event.

22 Claims, 52 Drawing Sheets

(56) References Cited

U.S. PATENT DOCUMENTS

2011/0083105 A1 4/2011 Shin et al.
2011/0193804 A1 8/2011 Shin et al.

FOREIGN PATENT DOCUMENTS

| KR | 10-2011-0093097 A | 8/2011 |
| KR | 10-2012-0071590 A | 7/2012 |

* cited by examiner

METHOD FOR CHANGING OBJECT POSITION AND ELECTRONIC DEVICE THEREOF

CLAIM OF PRIORITY

This application claims the benefit under 35 U.S.C. §119(a) from a Korean patent application filed in the Korean Intellectual Property Office on Sep. 5, 2012 and assigned Serial No. 10-2012-0098065, the entire disclosure of which is hereby incorporated by reference in its entirety.

BACKGROUND

1. Field of the Invention

The present disclosure relates to an electronic device. More particularly, the present invention relates to an apparatus and a method for changing a position of an object in an electronic device or an electronic device interface.

2. Description of the Related Art

As use of a multimedia service using an electronic device increases, an amount of information that should be processed and an amount of information that should be displayed by an electronic device or an electronic device screen increase. Accordingly, an interest in an electronic device having a touchscreen that can increase the size of a display unit by improving a space utility increases.

The touchscreen is an input/output (I/O) unit for performing an input and display of information on one screen. Accordingly, in case of using the touchscreen, an electronic device may increase a display area by removing a separate input unit such as a keypad thereby making available extra space for the display area.

An electronic device having a touchscreen may change the position of an object displayed on a display region depending on drag information that may be provided on the display. For example, when detecting a drag of a first item from an item list displayed on the touchscreen, the electronic device may change the position of the first item to a position to which the first item has been dragged. If a touch of the first item is released at a point unintended by a user during a drag process for the first item, the electronic device may change the position of the first item to the point unintended by the user. Accordingly, the user of the electronic device has an inconvenience of having to constantly maintain a drag operation for an object up to a point desired by the user.

SUMMARY

An aspect of the present invention is to address at least some of the above-mentioned problems and/or disadvantages and to provide at least the advantages described below. Accordingly, an aspect of the present invention is to provide an apparatus and a method for changing a position of an object in an electronic device.

Another aspect of the present invention is to provide an apparatus and a method for changing a position of a relevant object with consideration of a movement event characteristic of the object in an electronic device.

Still another aspect of the present invention is to provide an apparatus and a method for changing a position of a relevant object with consideration of a drag direction of the object in an electronic device.

Yet another aspect of the present invention is to provide an apparatus and a method for changing a position of a relevant object with consideration of a touch maintain time of the object in an electronic device.

Yet still another aspect of the present invention is to provide an apparatus and a method for changing a position of a relevant object with consideration of a touch frequency of the object in an electronic device.

Yet further another aspect of the present invention is to provide an apparatus and a method for changing a position of a relevant object with consideration of a drag distance of the object in an electronic device.

Yet still further another aspect of the present invention is to provide an apparatus and a method for switching a screen with consideration of a position movement event characteristic in an electronic device.

In accordance with an aspect of the present invention, a method for editing an object in an electronic device is provided. The method includes, when a first event occurs depending on detected touch information of at least one object among a plurality of objects displayed on a display unit, determining a movement interval corresponding to a characteristic of the first event, and changing a position of the at least one object depending on the movement interval corresponding to the characteristic of the first event.

The determining of the movement interval may include, when detecting a drag of the at least one object among the objects displayed on the display unit, determining a drag direction of the at least one object, and determining a corresponding movement interval mapped to the drag direction.

The determining of the movement interval may include, when detecting a drag of the at least one object among the objects displayed on the display unit, determining a drag direction of the at least one object, and determining a corresponding movement interval mapped to a drag direction.

The determining of the movement interval may include, when detecting a touch of the at least one object among the objects displayed on the display unit, determining a touch maintain time of the at least one object, and determining a corresponding movement interval mapped to the touch maintain time.

The determining of the movement interval may include, when detecting a touch of the at least one object among the objects displayed on the display unit, determining a touch frequency of the at least one object detected for a predetermined reference time, and determining a corresponding movement interval mapped to the touch frequency.

The determining of the movement interval may include, when detecting a drag of the at least one object among the objects displayed on the display unit, determining a drag region of the at least one object, determining a corresponding movement interval mapped to the drag region, and determining a position change direction of the object with consideration of a drag direction of the drag region.

The determining of the movement interval may include, when detecting a drag of the at least one object among the objects displayed on the display unit, determining a drag angle of the at least one object based on a reference angle, and determining a corresponding movement interval and a position change direction for the at least one object with consideration of the drag angle of the at least one object.

In accordance with another aspect of the present invention, an electronic device is provided. The electronic device includes a touchscreen, at least one processor, a memory, and a program stored in the memory and driven by the at least one processor, wherein when a first event occurs depending on detected touch information of at least one object among objects displayed on the touchscreen, the processor determines a corresponding movement interval depending on a characteristic of the first event, and changes a position of the at least one object depending on a movement interval corresponding to the characteristic of the first event.

When detecting a drag of the at least one object among the objects displayed on the touchscreen, the processor may determine a drag direction of the at least one object, and determine a corresponding movement interval mapped to the drag direction.

When detecting a drag of the at least one object among the objects displayed on the touchscreen, the processor may determine a drag distance of the at least one object, and determine a movement interval mapped to a drag direction.

When detecting a touch of the at least one object among the objects displayed on the touchscreen, the processor may determine a touch maintain time of the at least one object, and determine a corresponding movement interval mapped to the touch maintain time.

When detecting a touch of the at least one object among the objects displayed on the touchscreen, the processor may determine a touch frequency of the at least one object detected for a predetermined reference time, and determine a corresponding movement interval mapped to the touch frequency.

When detecting a drag of the at least one object among the objects displayed on the touchscreen, the processor may determine a drag region of the at least one object, determine a corresponding movement interval mapped to the drag region, and determine a position change direction of the object with consideration of a drag direction of the drag region.

When detecting a drag of the at least one object among the objects displayed on the touchscreen, the processor may determine a drag angle of the at least one object based on a reference angle, and determine a corresponding movement interval and a position change direction for the at least one object with consideration of the drag angle of the at least one object.

In accordance with a still another aspect of the present invention, a method for editing an object in an electronic device is provided. The method includes displaying a plurality of objects on a display unit, detecting a drag of at least one object among the plurality of objects, determining a drag direction, and changing a position of the at least one object depending on a position change direction and a movement interval corresponding to the drag direction.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Exemplary embodiments of the present invention will be described herein below with reference to the accompanying drawings to assist in a comprehensive understanding of exemplary embodiments of the invention as defined by the claims and their equivalents. Accordingly, those of ordinary skill in the art will recognize that various changes and modifications of the embodiments described herein can be made without departing from the scope and spirit of the invention. In the following description, well-known functions or constructions may not be described in detail when they would obscure appreciation of the present invention by a person of ordinary skill in the art with unnecessary detail of the well-known functions and structures. Also, the terms used herein are defined according to the functions of the present invention as would be understood by a person of ordinary skill in the art. Thus, the terms may vary depending on user's or operator's intension and usage. That is, the terms used herein must be understood based on the descriptions made herein in view of the ordinary level of skill in the art.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a technology for changing the position of an object in an electronic device.

In the description below, an electronic device may include a portable electronic device having a touchscreen, a portable terminal, a mobile terminal, a mobile communication terminal, a Personal Digital Assistant (PDA), a laptop computer, a desktop computer, a smart phone, a netbook, a television, a Mobile Internet Device (MID), a Ultra Mobile Personal Computer (PC), a table PC, a navigation, a mobile pad, a media player, a wrist watch, a camera, an MP3 layer, etc.

Figure 1:
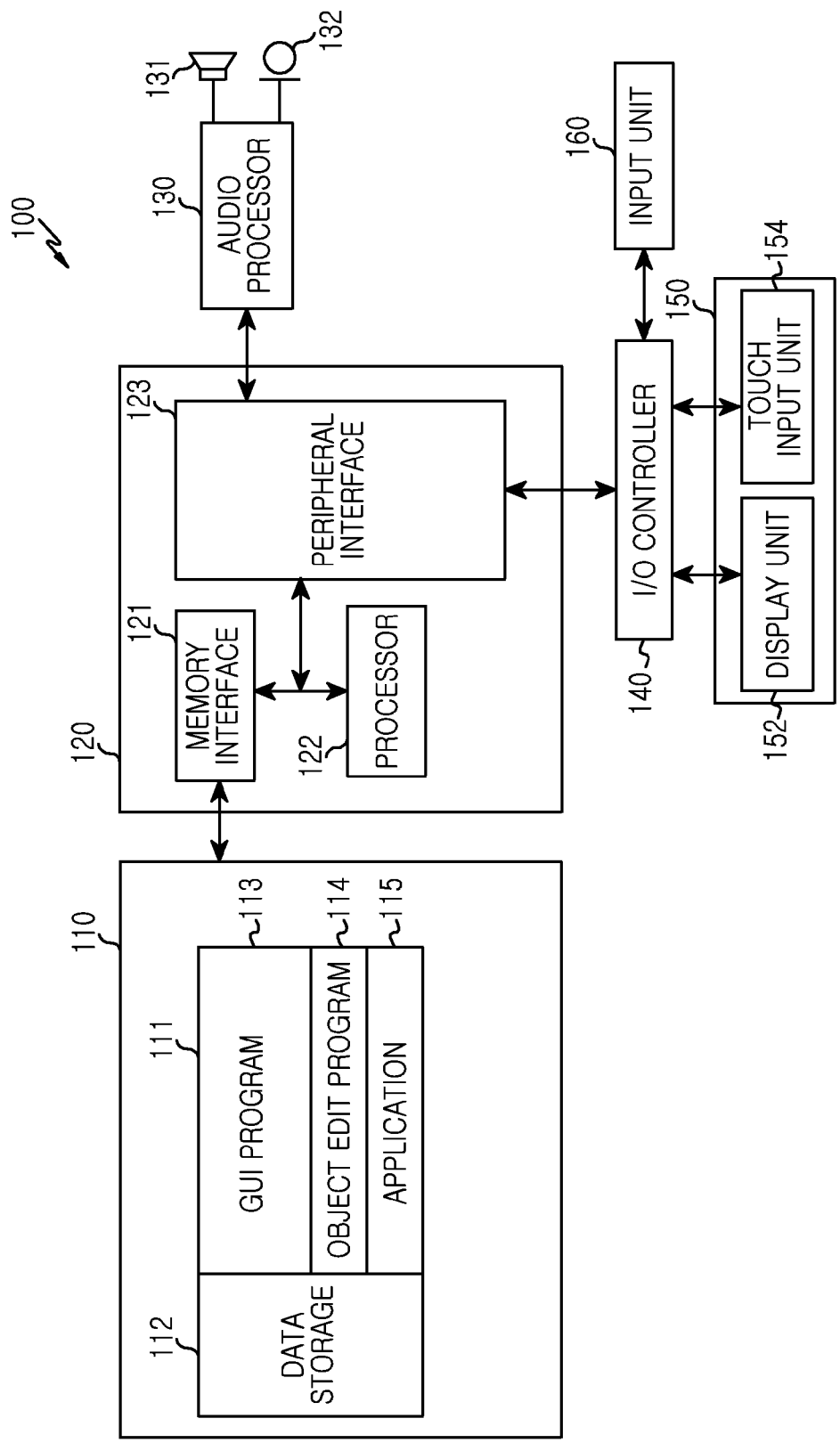
FIG. 1 is a block diagram illustrating an electronic device according to an embodiment of the present invention.

FIG. 1 is a block diagram illustrating an electronic device according to the present invention.

As illustrated in FIG. 1, the electronic device 100 may include a memory 110, a processor unit 120, an audio processor 130, an input/output (I/O) controller 140, a touchscreen 150, and an input unit 160, or any combination thereof. Here, a plurality of memories 110 may exist within the electronic device 100.

The memory 110 may include a program storage 111 for storing a program for controlling an operation of the electronic device 100, and a data storage 112 for storing data occurring during execution of a program.

The data storage 112 may store object movement interval information depending on a position movement event characteristic. At this point, the data storage 112 may change the object movement interval information depending on the related position movement event characteristic stored in advance according to a user's manipulation.

The program storage 111 may include a Graphic User Interface (GUI) program 113, an object edit program 114, and at least one application 115. Here, a program included in the program storage 111 is a set of instructions and may be expressed as an instruction set.

The GUI program 113 may include at least one software element for providing a user interface on a display unit 152 using graphics. For example, the GUI program 113 may control to display application information driven by the processor 122 on the display unit 152. For another example, in the case where the position of an object is changed by the object edit program 114, the GUI program 113 may control to change and display the position of the object.

The GUI program 113 may control to display a preview screen for moving the position of an object depending on a related position movement event characteristic. For example, the GUI program 113 may control to divide the display region of the display unit 152 and display a preview screen as illustrated in FIGS. 7A to 7F. For another example, the GUI program 113 may also control to allow a preview screen to overlap an object list as illustrated in FIGS. 8A to 8D. In other words, the object list may be presented as viewable under an overlapped preview screen.

The object edit program 114 may include at least one software element for changing the position of an object depending on a related position movement event characteristic. For example, the object edit program 114 may determine an object movement direction for moving a first object. In the case where a position movement event for the first object occurs, the object edit program 114 may determine an object movement interval depending on a related position movement event characteristic stored in the data storage 112. After that, the object edit program 114 may change the position of the first object depending on a related object movement interval corresponding to an object movement direction and a position movement event characteristic. For another example, in the case where a position movement event for the first object occurs, the object edit program 114 may determine an object movement interval and an object movement direction depending on a related position movement event characteristic stored in the data storage 112. After that, the object edit program 114 may change the position of the first object depending on an object movement interval and an object movement direction corresponding to the position movement event characteristic. Here, the position movement event may include at least one of a drag direction, a touch maintain time, a drag distance, and a touch frequency.

When a position movement event occurs, the object edit program 114 may control to display a preview screen for changing the position of an object depending on a position movement event characteristic.

The object edit program 114 may include at least one software element for changing object movement interval information depending on a position movement event characteristic stored in the data storage 112. For example, in the case where an object movement interval change event occurs, the object edit program 114 may change object movement interval information depending on position movement event characteristic stored in the data storage 112 according to a user's input information provided from a touch input unit 154 or the input unit 160.

The application 115 may include a software element for at least one application installed in the electronic device 100.

Referring again to FIG. 1, the processor unit 120 may include a memory interface 121, at least one processor 122, and a peripheral interface 123. Here, the memory interface 121, the at least one processor 122, and the peripheral interface 123 may be realized as at least one integrated circuit or separate elements.

The memory interface 121 may control a memory access of elements like the processor 122 or the peripheral interface 123.

The peripheral interface 123 may control connection between an input/output (I/O) peripheral of the electronic device 100 and the processor 122 and the memory interface 121.

The processor 122 may control the electronic device 100 to provide various multimedia services using at least one software program. At this point, the processor 122 may execute at least one program stored in the memory 110 to provide a service corresponding to the relevant program.

The audio processor 130 may provide an audio interface between a user and the electronic device 100 via a speaker 131 and a microphone 132.

The I/O controller 140 may provide an interface between an I/O unit like the touchscreen 150 and the input unit 160, and the peripheral interface 123.

The touchscreen 150 is an I/O unit for performing output of information and input of information, and may include a display unit 152 and the touch input unit 154.

The display unit 152 may display status information of the electronic device 100, a character input by a user, a moving picture, a still picture, etc. For example, the display unit 152 may display information of an application driven by the processor 122. For another example, the display unit 152 may display an object on a position determined by the object edit program 114.

The display unit 152 may display a preview screen for changing the position of an object via the object edit program 114. For example, the display unit 152 may divide a display region and display the preview screen as illustrated in FIGS. 7A to 7F. For another example, the display unit 152 may display such that the preview screen overlaps an object list as illustrated in FIGS. 8A to 8D. In other words, the object list may be presented and visible for viewing under an overlapped preview screen which may be somewhat translucent.

The touch input unit 154 may provide touch information detected via a touch panel to the processor unit 120 via the I/O controller 140. At this point, the touch input unit 154 may provide touch information by a touch pen or a finger to the processor unit 120 via the I/O controller 140.

The input unit 160 may provide input data generated by a user's selection to the processor unit 120 via the I/O controller 140. For example, the input unit 160 may include only a control button for controlling the electronic device 100. For another example, the input unit 160 may include a keypad for receiving input data from a user.

Though not shown, the electronic device 100 may include a communication system for performing a communication function for voice communication and data communication. At this point, the communication system may be divided into a plurality of communication submodules supporting different communication networks. For example, though not limited thereto, the communication network may include a Global System for Mobile Communication (GSM) network, an Enhanced Data GSM Environment (EDGE) network, a Code Division Multiple Access (CDMA) network, a W (Wideband)-CDMA network, a Long Term Evolution (LTE) network, an Orthogonal Frequency Division Multiple Access (OFDMA) network, a wireless Local Area Network (LAN), a Bluetooth network, a Near Field Communication (NFC), etc.

Figure 2:
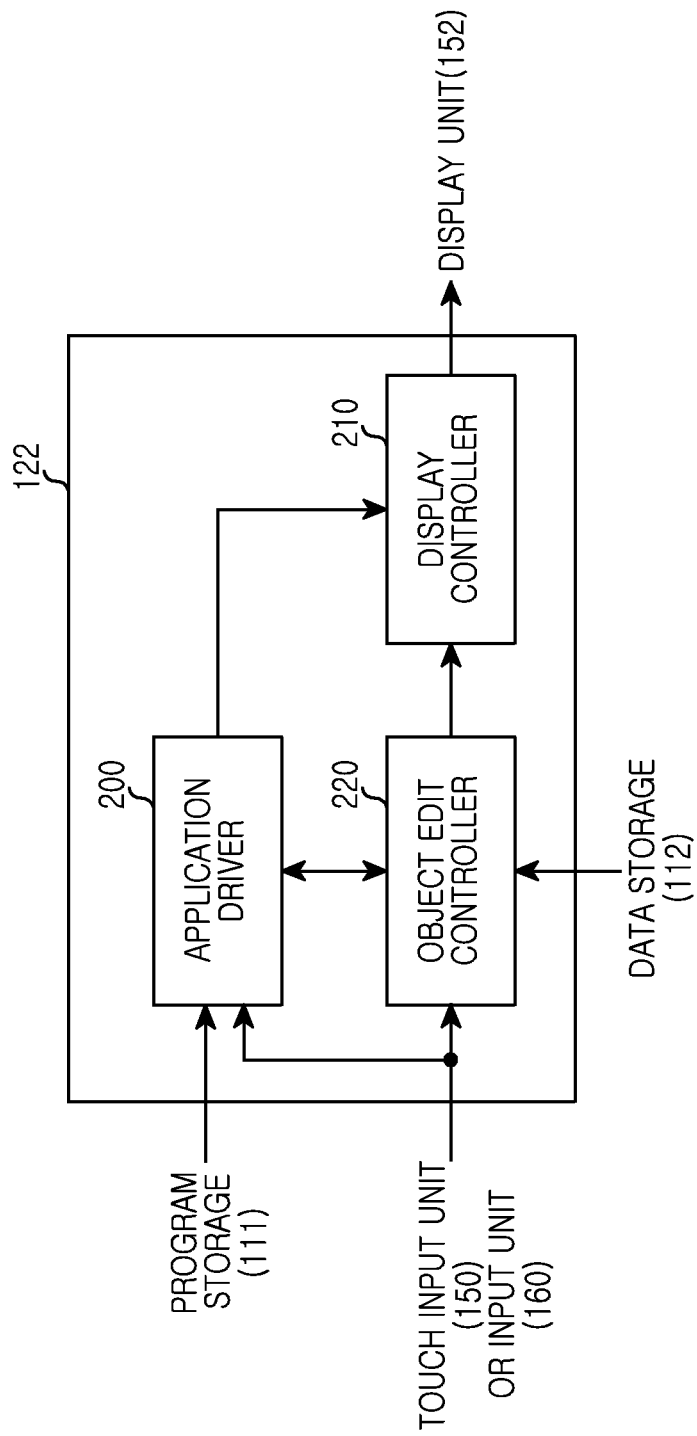
FIG. 2 is a block diagram illustrating a processor according to an embodiment of the present invention.

FIG. 2 is a block diagram illustrating a processor according to an embodiment of the present invention such as processor 122 depicted in FIG. 1.

As illustrated in FIG. 2, the processor may include an application driver 200, a display controller 210, and an object edit controller 220.

The application driver 200 may execute at least one application among one or more applications 115 stored in the program storage 111 to provide a service corresponding to the relevant application that is executed.

The display controller 210 may execute the GUI program 113 stored in the program storage 111 to control to display a user interface on the display unit 152 using graphics. For example, the display controller 210 may control to display information of an application driven by the application driver 200 on the display unit 152. For another example, when the position of an object is changed by the object edit controller 220, the display controller 210 may control to change and display the position of the object. At this point, the display controller 210 may change the position of the object by considering that the relevant object has jumped to the position determined by the object edit controller 220.

The display controller 210 may control to display a preview screen for moving the position of an object depending on a position movement event characteristic so that a user may determine the position of the object changed by the object edit controller 220 in advance. For example, the display controller 210 may control to divide a display region of the display unit 152 and display a preview screen as illustrated in FIGS. 7A to 7F. For another example, the display controller 210 may control to allow the preview screen to overlap an object list as illustrated in FIGS. 8A to 8D.

The object edit controller 220 may execute the object edit program 114 stored in the program storage 111 to change the position of an object depending on a characteristic of a position movement event. For example, the object edit controller 220 may determine an object movement direction for moving a first object. In the case where a position movement event for the first object occurs, the object edit controller 220 may determine an object movement interval depending on a related position movement event characteristic stored in the data storage 112. After that, the object edit controller 220 may change the position of the first object depending on an object movement interval corresponding to an object movement direction and a related position movement event characteristic. For another example, in the case where a position movement event for the first object occurs, the object edit controller 220 may determine an object movement interval and an object movement direction depending on a related position movement event characteristic in the data storage 112. After that, the object edit controller 220 may change the position of the first object depending on an object movement interval and an object movement direction corresponding to a related position movement event characteristic. Here, the position movement event may include at least one of a drag direction, a touch maintain time, a drag distance, and a touch frequency.

In the case where a position movement event occurs, the object edit controller 220 may control the display controller 210 to display a preview screen for changing the position of an object depending on a position movement event characteristic.

The object edit controller 220 may change object movement interval information depending on a position movement event characteristic stored in the data storage 112. For example, in the case where an object movement interval change event occurs, the object edit controller 220 may change object movement interval information corresponding to the position movement event characteristic stored in the data storage 112 depending on a user's input information provided from the touch input unit 154 or the input unit 160.

In the above embodiment, the processor 122 of the electronic device 100 may include elements for changing the position of an object as separate modules.

In another embodiment, the processor 122 of the electronic device 100 may execute the object edit program 114 to change the position of an object inside one module.

As described above, the electronic device may change the position of an object depending on a position movement event characteristic. At this point, to discriminate a position change service of an object from a separate different service that depends on touch information, the electronic device may switch to an object edit mode and then change the position of an object depending on a position movement event characteristic. Here, the electronic device may enter the object edit mode using at least one of a hardware button input, icon selection, motion detection of the electronic device, user gesture detection, and object selection.

Figure 3:
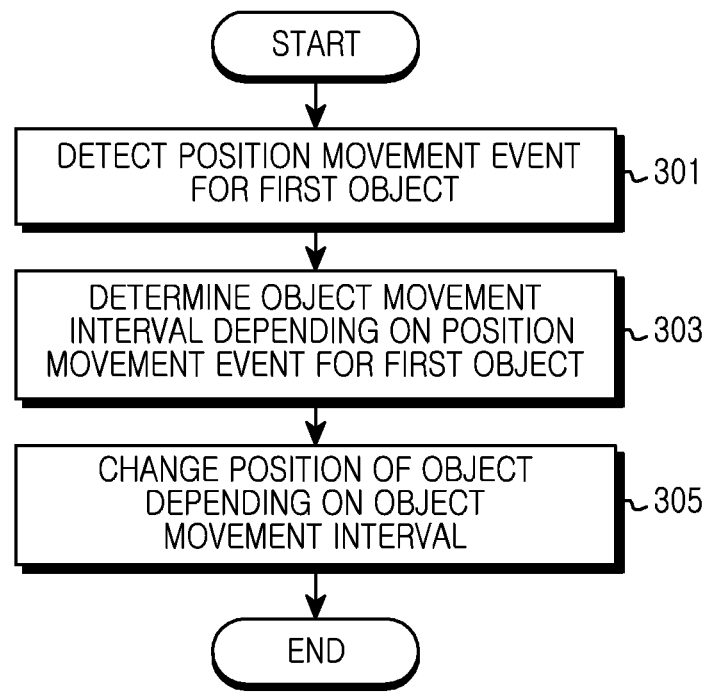
FIG. 3 is a flowchart illustrating a procedure for changing the position of an object in an electronic device according to an embodiment of the present invention.

FIG. 3 is a flowchart illustrating a procedure for changing the position of an object in an electronic device according to an embodiment of the present invention.

Referring to FIG. 3, the electronic device may detect a position movement event for a first object in step 301. For example, the electronic device may detect a drag of the first object from an object list displayed on the display unit 152. For another example, the electronic device may detect a touch of the first object from the object list displayed on the display unit 152.

After that, the electronic device may proceed to step 303 to determine an object movement interval depending on a position movement event characteristic of the first object. For example, the electronic device may determine an object movement interval that has changed the position of the first object with consideration of a drag direction of the first object. For another example, the electronic device may determine an object movement interval that has changed the position of the first object with consideration of a drag distance of the first object. For still another example, the electronic device may determine an object movement interval that has changed the position of the first object with consideration of a drag region of the first object. For yet another example, the electronic device may determine an object movement interval that has changed the position of the first object with consideration of a touch maintain time of the first object. For further yet another example, the electronic device may determine an object movement interval that has changed the position of the first object with consideration of a touch frequency of the first object. In this case, the electronic device may determine an object movement interval that has changed the position of the first object with consideration of a touch frequency of the first object detected for a reference time.

After determining an object movement interval, the electronic device may proceed to step 305 to change the position of the first object depending on an object movement interval corresponding to a position movement event characteristic. For example, the electronic device may jump by an object movement interval depending on a position movement event characteristic to change the position of the first object.

Figure 4:
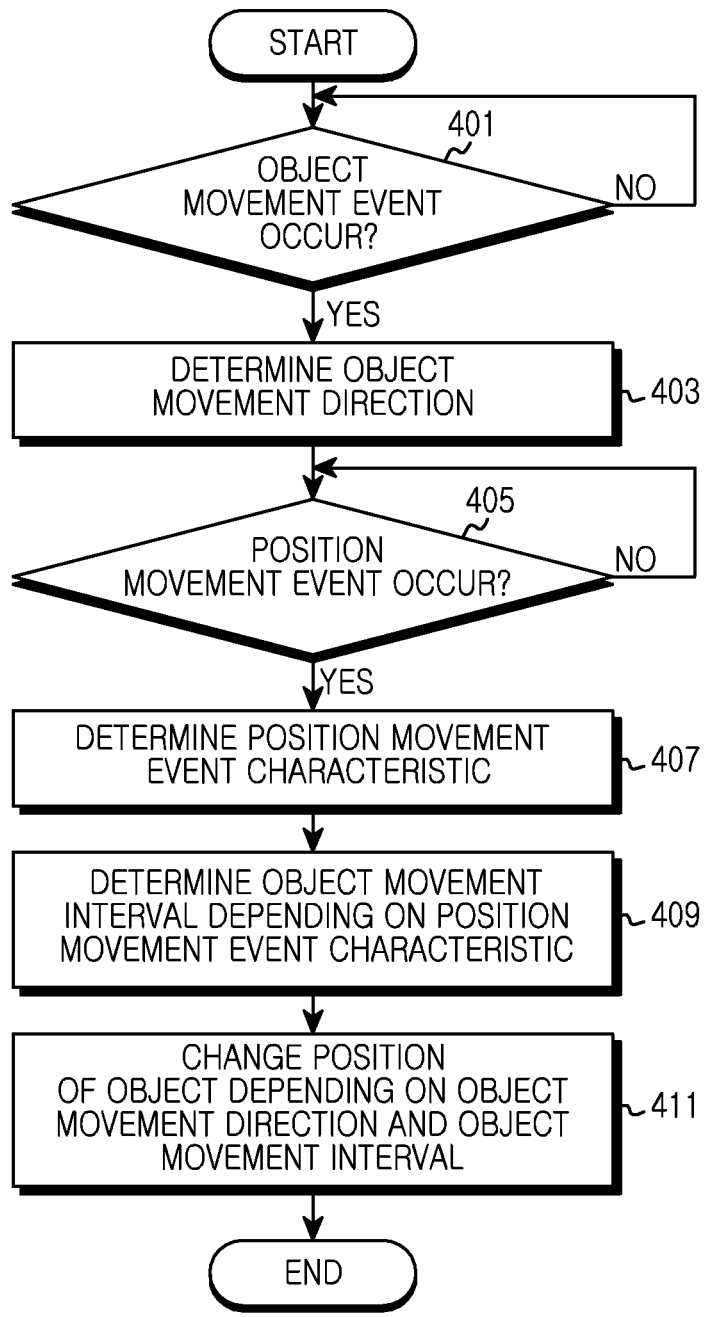
FIG. 4 is a flowchart illustrating a procedure for changing the position of an object depending on a characteristic of a position movement event in an electronic device according to an embodiment of the present invention.

FIG. 4 is a flowchart illustrating a procedure for changing the position of an object depending on a characteristic of a position movement event in an electronic device according to an embodiment of the present invention.

Referring to FIG. 4, the electronic device may determine whether an object movement event occurs in step 401. For example, the electronic device may determine whether an object movement event occurs using at least any one of a hardware button input, icon selection, motion detection of the electronic device, user gesture detection, and object selection.

In the case where an object movement event occurs, the electronic device may proceed to step 403 to determine an object movement direction. For example, in the case where an object movement event occurs, the electronic device may switch to an object edit mode. After that, the electronic device may recognize a drag direction detected via the touch input unit 154 as an object movement direction. For another example, the electronic device may determine an object movement direction with consideration of selection information of a directional icon.

After that, the electronic device may proceed to step 405 to determine whether a position movement event of a first object occurs. For example, the electronic device may determine whether a drag of the first object is detected from an object list displayed on the display unit 152. For another example, the electronic device may determine whether a touch of the first object is detected from the object list displayed on the display unit 152.

In the case where a position movement event occurs, the electronic device may proceed to step 407 to determine the characteristic of a position movement event. For example, the electronic device may determine a drag direction of the first object as one characteristic. For another example, the electronic device may determine a drag distance of the first object as another characteristic. For still another example, the electronic device may determine a drag region of the first object as another characteristic. For yet another example, the electronic device may determine a touch maintain time of the first object as another characteristic. For still yet another example, the electronic device may determine a touch frequency of the first object as another characteristic. In this case, the electronic device may determine a touch frequency of the first object detected for a reference time.

After that, the electronic device may proceed to step 409 to determine an object movement interval depending on a position change event characteristic. For example, the electronic device may determine an object movement interval that has changed the position of the first object with consideration of a drag direction of the first object. For another example, the electronic device may determine an object movement interval that has changed the position of the first object with consideration of a drag distance of the first object. For still another example, the electronic device may determine an object movement interval that has changed the position of the first object with consideration of a drag region of the first object. For yet another example, the electronic device may determine an object movement interval that has changed the position of the first object with consideration of a touch maintain time of the first object. For further another example, the electronic device may determine an object movement interval that has changed the position of the first object with consideration of a touch frequency of the first object. In this case, the electronic device may determine an object movement interval that has changed the position of the first object with consideration of a touch frequency of the first object detected for a reference time.

After determining the object movement interval, the electronic device may proceed to step 411 to change the position of the first object depending on an object movement interval corresponding to a position movement event characteristic. For example, the electronic device may jump by an object movement interval depending on a position movement event characteristic to change the position of the first object.

As described above, the electronic device may change the position of an object depending on a movement interval corresponding to an event characteristic. For example, the electronic device may change the position of an object with consideration of a drag direction of the object as illustrated in FIGS. 5A to 5E, or FIGS. 6A to 6E.

FIGS. 5A to 5E are views illustrating screen configuration for changing the position of an object with consideration of a drag direction in an electronic device according to an embodiment of the present invention.

Figure 5A:
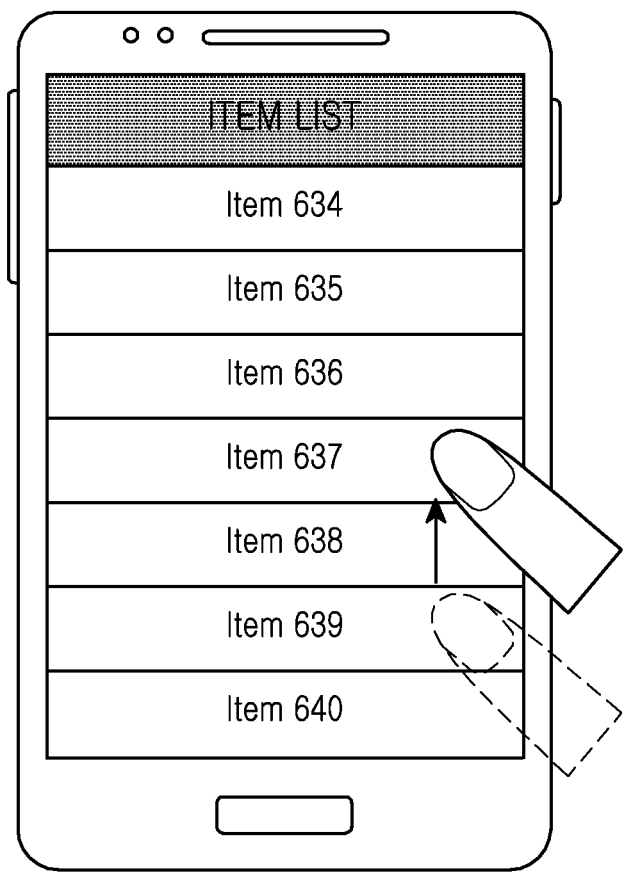
FIGS. 5A, 5B, 5C, 5D, and 5E are views illustrating screen configuration for changing the position of an object with consideration of a drag direction in an electronic device according to an embodiment of the present invention.

The electronic device may display an item list on the display unit 152 as illustrated in FIG. 5A in order to provide a service corresponding to an application. In the description below, it may be assumed that the electronic device changes the position of at least one item included in an item list to an upper or upward direction.

In the case where a drag of an item 639 to the upper or upward direction is detected from the item list of FIG. 5A, the electronic device may change the position of the item 639 to the upper or upward direction by 100 depending on object movement interval information corresponding to the drag to the upper or upward direction. Accordingly, the electronic device may display the item 639 of the changed position on the display unit 152 as illustrated in FIG. 5B, or in other words, more particularly, item 639 is moved from between items 638 and 640 in FIG. 5A to between items 538 and 539 in FIG. 5B, thus 100 units.

Figure 5B:
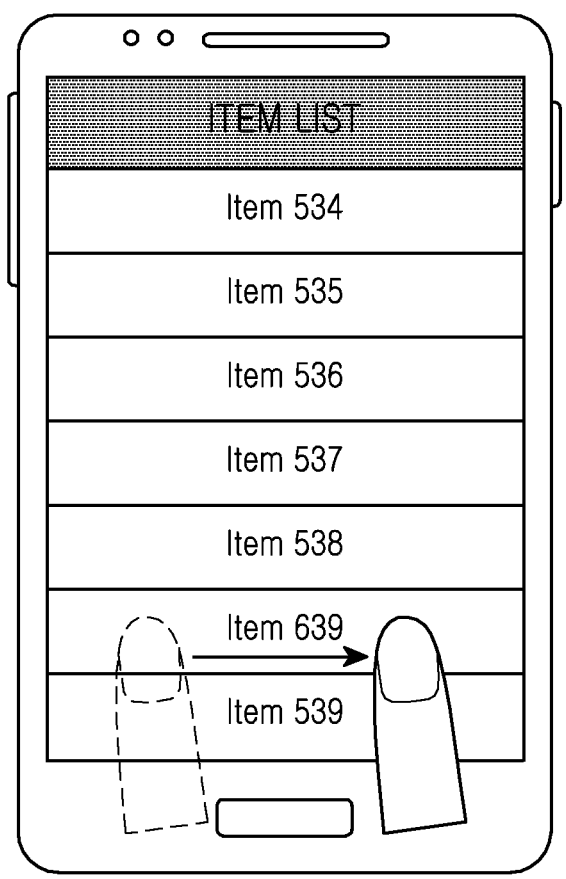

In the case where a drag of an item 639 to a right direction is detected from the item list of FIG. 5B, the electronic device may change the position of the item 639 to the upper or upward direction by 200 depending on object movement interval information corresponding to the drag to the right direction. Accordingly, the electronic device may display the item 639 of the changed position on the display unit 152 as illustrated in FIG. 5C or in other words, more particularly, item 639 is moved from between items 538 and 539 in FIG. 5B to between items 338 and 339 in FIG. 5C, thus 200 units.

Figure 5C:
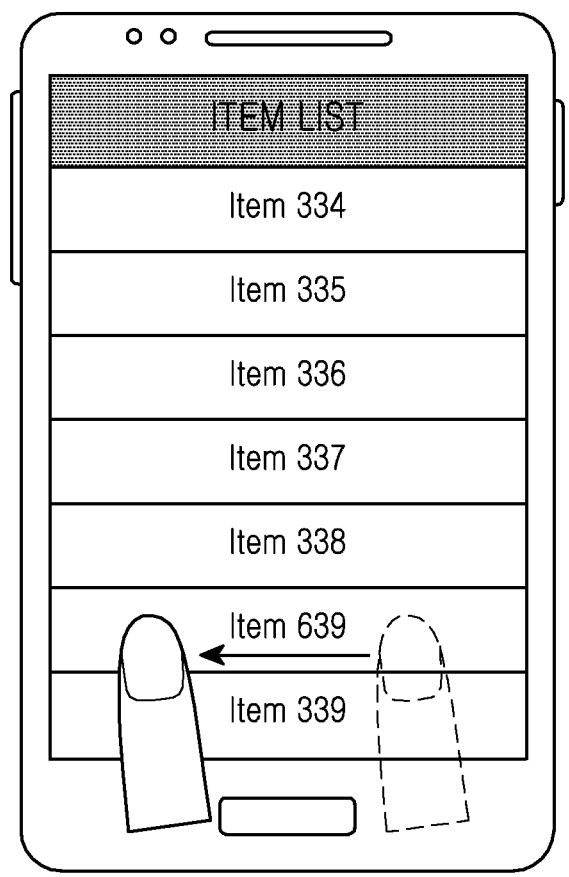

In the case where a drag of an item 639 to a left direction is detected from the item list of FIG. 5C, the electronic device may change the position of the item 639 to the upper or upward direction by 50 depending on object movement interval information corresponding to the drag to the left direction. Accordingly, the electronic device may display the item 639 of the changed position on the display unit 152 as illustrated in FIG. 5D or in other words, more particularly, item 639 is moved from between items 338 and 339 in FIG. 5C to between items 288 and 289 in FIG. 5D, thus 50 units.

Figure 5D:
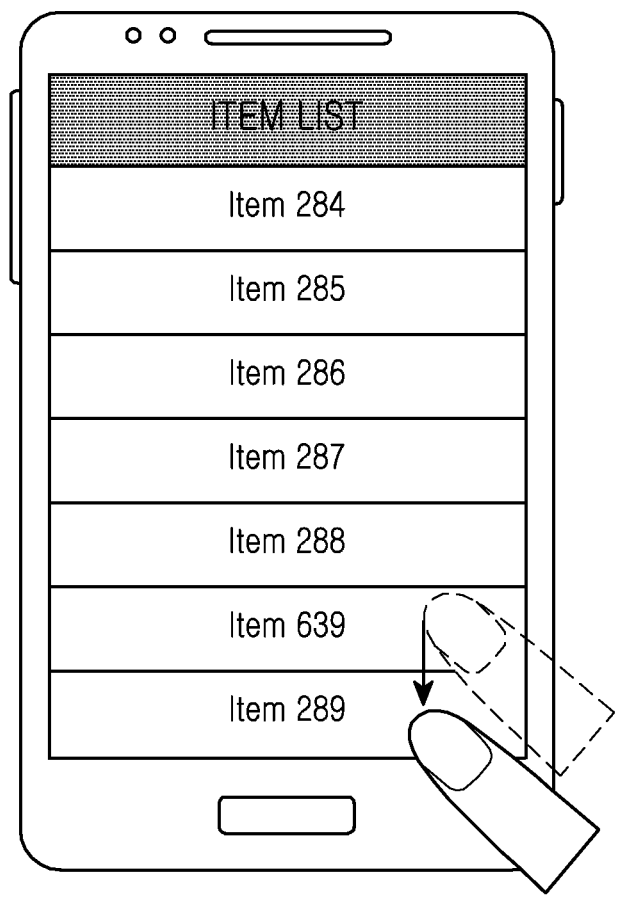
Figure 5E:
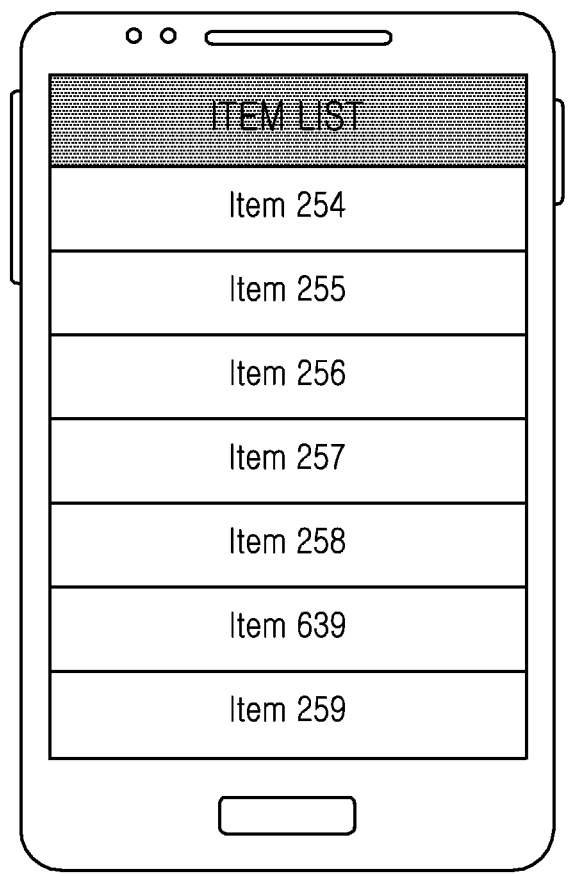

In the case where a drag of an item 639 to a lower direction is detected from the item list of FIG. 5D, the electronic device may change the position of the item 639 to the upper or upward direction by 30 depending on object movement interval information corresponding to the drag to the lower or downward direction. Accordingly, the electronic device may display the item 639 of the changed position on the display unit 152 as illustrated in FIG. 5E or in other words, more particularly, item 639 is moved from between items 288 and 289 in FIG. 5D to between items 258 and items 259 in FIG. 5E, thus 30 units.

As described above, the electronic device may move the item 639 positioned at a 639-th position of the item list to a 259-th position by only four times of drag operations as illustrated in FIGS. 5A to 5E.

FIGS. 6A to 6E illustrate screen configuration for changing the position of an object with consideration of a drag direction in an electronic device according to another embodiment of the present invention.

Figure 6A:
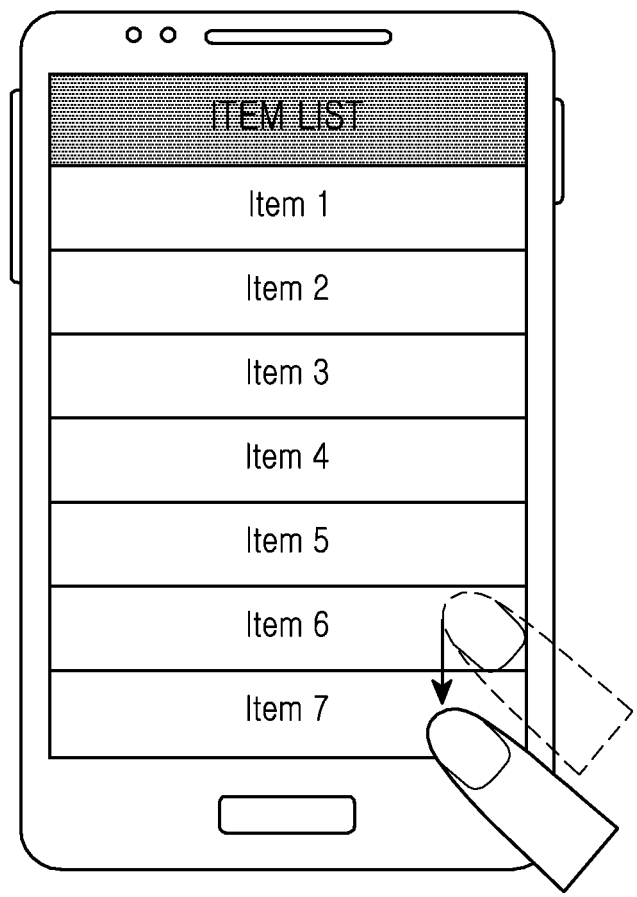
FIGS. 6A, 6B, 6C, 6D and 6E are views illustrating screen configuration for changing the position of an object with consideration of a drag direction in an electronic device according to another embodiment of the present invention.

To provide a service corresponding to an application, the electronic device may display an item list on the display unit 152 as illustrated in FIG. 6A. In the description below, it may be assumed that the electronic device changes the position of an item to a lower direction.

In the case where a drag of an item 6 to the lower or downward direction is detected from the item list of FIG. 6A, the electronic device may change the position of the item 6 to the lower or downward direction by 30 depending on object movement interval information corresponding to the drag to the lower or downward direction. Accordingly, the electronic device may display the item 6 of the changed position on the display unit 152 as illustrated in FIG. 6B.

Figure 6B:
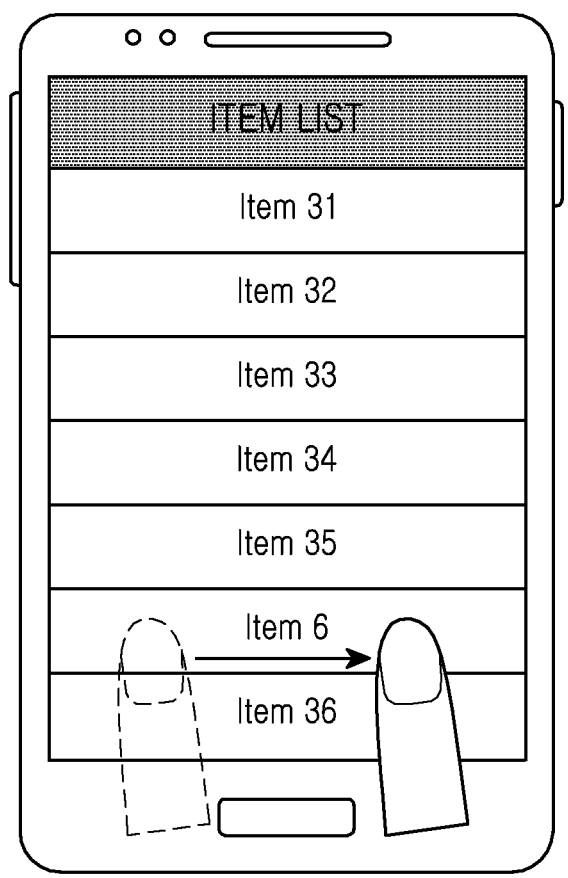

In the case where a drag of an item 6 to a right direction is detected from the item list of FIG. 6B, the electronic device may change the position of the item 6 to the lower or downward direction by 200 depending on object movement interval information corresponding to the drag to the right direction. Accordingly, the electronic device may display the item 6 of the changed position on the display unit 152 as illustrated in FIG. 6C.

Figure 6C:
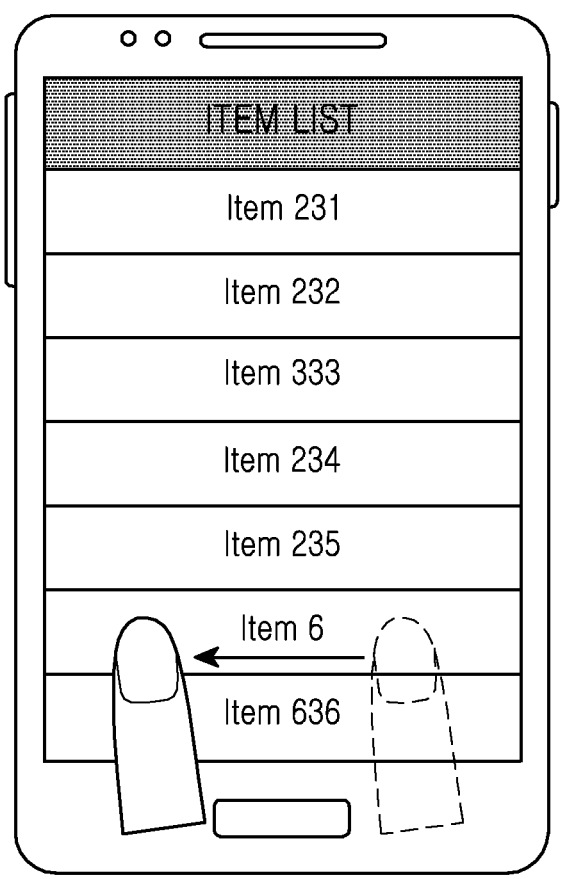

In the case where a drag of an item 6 to a left direction is detected from the item list of FIG. 6C, the electronic device may change the position of the item 6 to the lower or downward direction by 50 depending on object movement interval information corresponding to the drag to the left direction. Accordingly, the electronic device may display the item 6 of the changed position on the display unit 152 as illustrated in FIG. 6D.

Figure 6D:
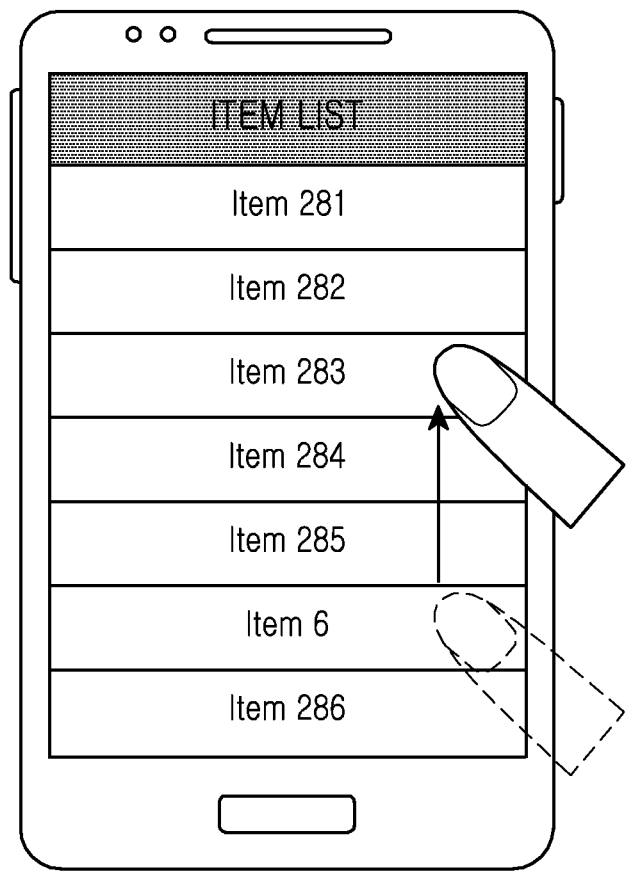
Figure 6E:
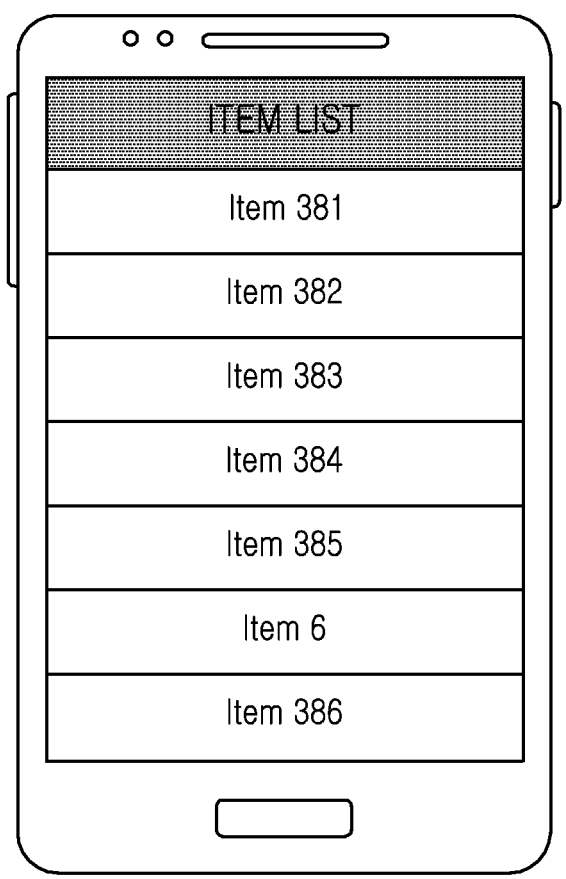

In the case where a drag of an item 6 to an upper direction is detected from the item list of FIG. 6D, the electronic device may change the position of the item 6 to the lower or downward direction by 100 predetermined units depending on object movement interval information corresponding to the drag to the upper or upward direction. Accordingly, the electronic device may display the item 6 of the changed position on the display unit 152 as illustrated in FIG. 6E.

As described above, the electronic device may move the item 6 positioned at a 6-th position of the item list to a 386-th position by only four times of drag operations as illustrated in FIGS. 6A to 6E.

As described above, in the case where a drag of an object is detected, the electronic device may change the position of the dragged object depending on object movement interval information mapped to the drag direction. At this point, the electronic device may map a specific drag direction to a separate control command, not an object movement interval. For example, in the case where the electronic device has mapped a lower direction drag to a cancel command, the electronic device may change the position of an object to a previous position depending on a drag to the lower or downward direction for a specific object.

The electronic device may display a preview screen for a dragged object on the display unit 152 as illustrated in FIGS. 7A to 7F or FIGS. 8A to 8D so that a user may determine the position to which an object is to move depending on a drag direction in advance.

FIGS. 7A to 7F illustrate a preview screen for changing an object position in an electronic device according to an embodiment of the present invention.

Figure 7A:
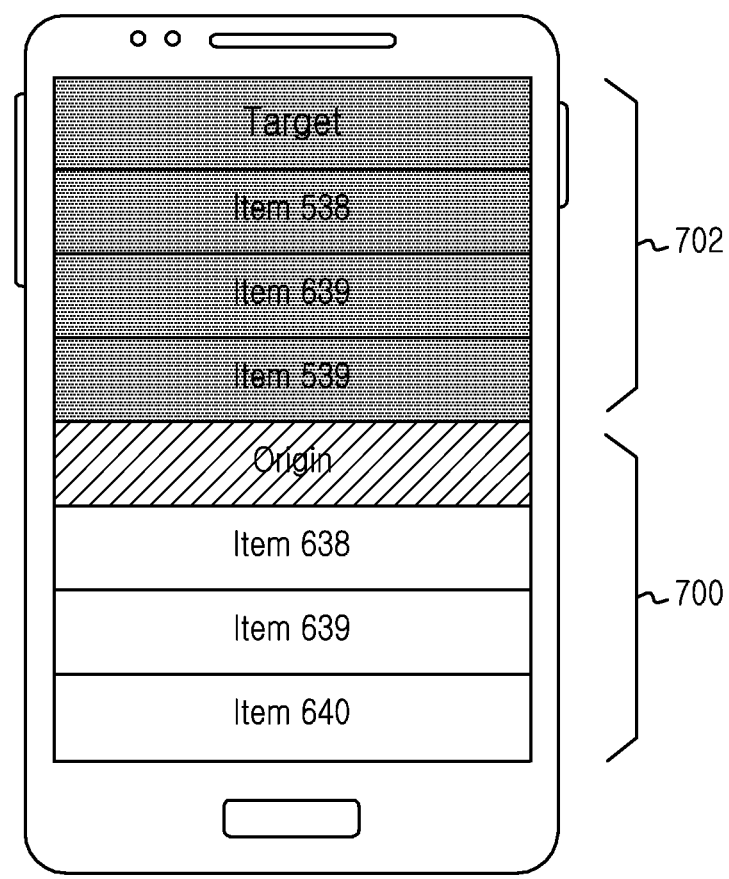
FIGS. 7A, 7B, 7C, 7D, 7E and 7F are views illustrating a preview screen for changing an object position in an electronic device according to an embodiment of the present invention.

In case of changing the position of an object with consideration of the drag direction of the object, the electronic device may display a preview screen with consideration of the drag direction of the object as illustrated in FIGS. 7A to 7F. For example, as illustrated in FIG. 5A, in the case where a drag of an item 639 to an upper direction is detected, the electronic device may display a preview screen 702 for changing the position of an item 639 by 100 depending on a drag to the upper or upward direction on the upper direction of an item list 700 as illustrated in FIG. 7A. At this point, the electronic device may additionally change the position of the item 639 depending on the touch information of the item 639 detected inside the preview screen 702.

Figure 7B:
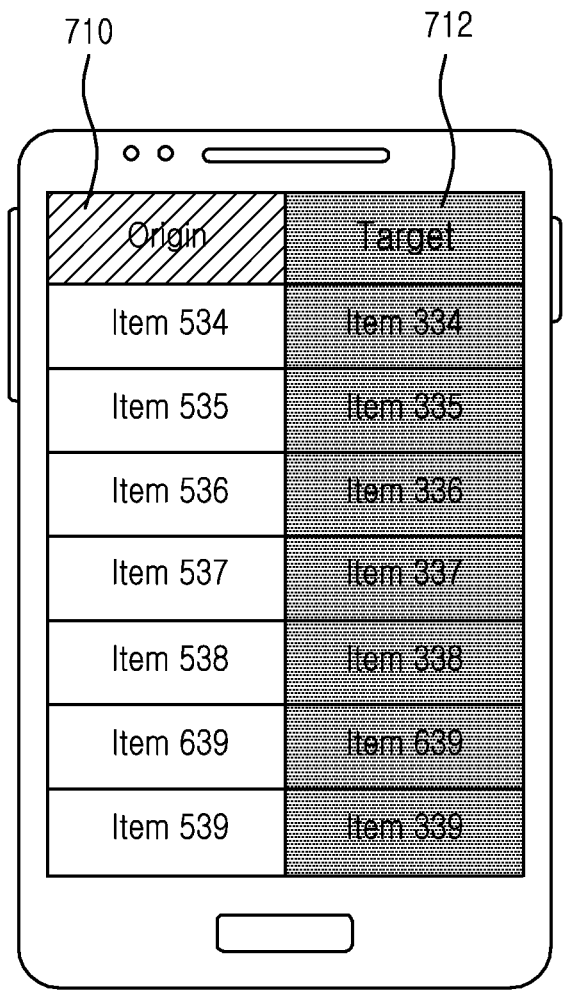

In the case where a drag of the item 639 to a right direction is detected as illustrated in FIG. 5B, the electronic device may display a preview screen 712 for changing the position of the item 639 by 200 depending on the drag to the right direction on the right direction of an item list 710 as illustrated in FIG. 7B.

Figure 7C:
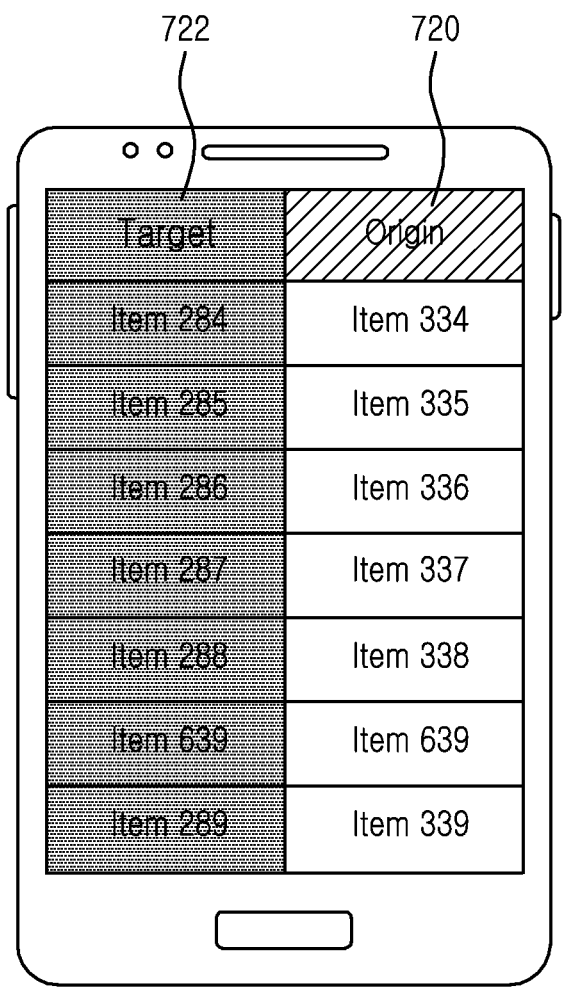

In the case where a drag of the item 639 to a left direction is detected as illustrated in FIG. 5C, the electronic device may display a preview screen 722 for changing the position of the item 639 by 50 depending on the drag to the left direction on the left direction of an item list 720 as illustrated in FIG. 7C.

Figure 7D:
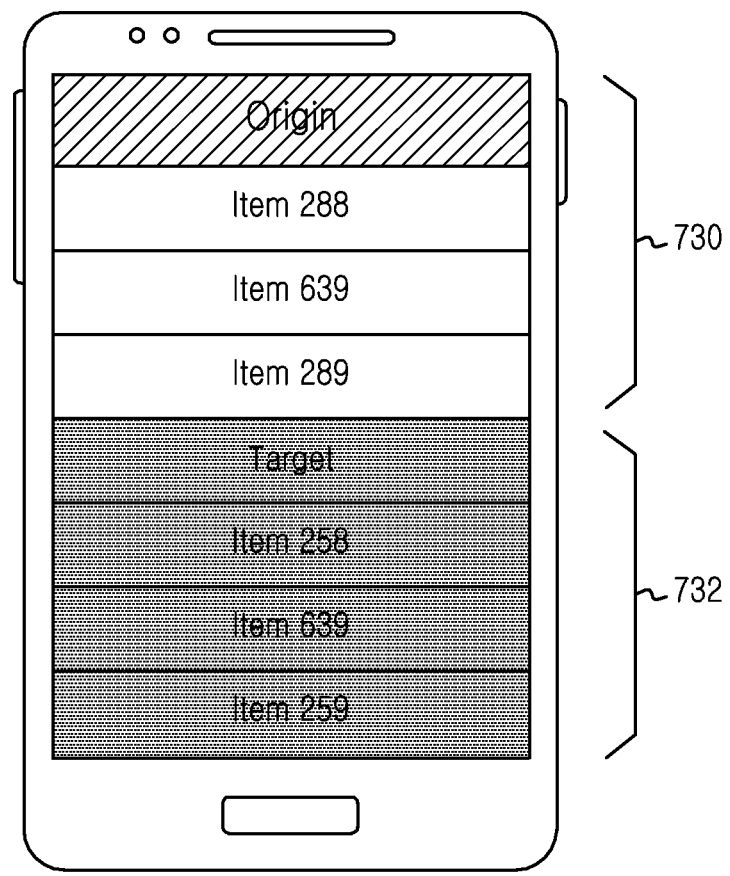

In the case where a drag of the item 639 to a lower direction is detected as illustrated in FIG. 5D, the electronic device may display a preview screen 732 for changing the position of the item 639 by 30 depending on the drag to the lower or downward direction on the lower or downward direction of an item list 730 as illustrated in FIG. 7D.

As described above, the electronic device may divide a display region of a drag direction and display a preview screen for changing the position of an object on the display unit 152.

In another embodiment, the electronic device may divide the display region in a fixed direction and display a preview screen. For example, in the case where a drag for changing the position of an object is detected, the electronic device may display a preview screen in the right direction of an item list without consideration of a drag direction of the object as illustrated in FIG. 7B.

In still another embodiment, the electronic device may display a preview screen for an object on the display unit 152 with consideration of the display shape of the display unit 152. For example, in the case where the display unit 152 of the electronic device is long in a vertical direction (portrait), the electronic device may display a preview screen for an object whose position is changed in the upper or upward direction of an item list as illustrated in FIG. 7A or in the lower or downward direction of the item list as illustrated in FIG. 7D. For further another example, in the case where the display unit 152 of the electronic device is long in a horizontal direction (horizontal), the electronic device may display a preview screen for an object whose position is changed in the right direction of an item list or the left direction of the item list.

FIGS. 8A to 8D illustrate a preview screen for changing an object position in an electronic device according to an embodiment of the present invention.

Figure 8A:
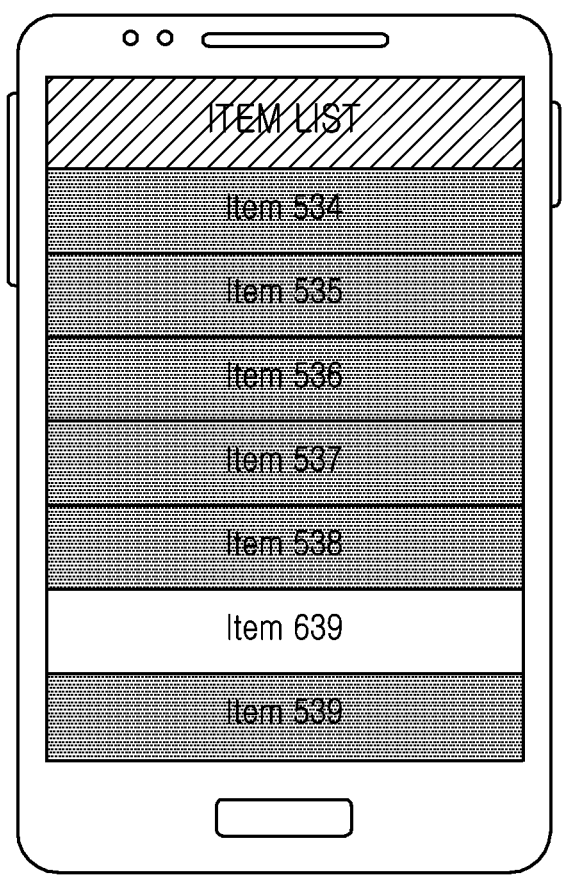
FIGS. 8A, 8B, 8C and 8D are views illustrating a preview screen for changing an object position in an electronic device according to an embodiment of the present invention.

In case of changing the position of an object with consideration of the drag direction of the object, the electronic device may display a preview screen for changing other objects excluding an object whose position is changed from an object list as illustrated in FIGS. 8A to 8D. For example, in the case where a drag of an item 639 to an upper direction is detected as illustrated in FIG. 5A, the electronic device may allow a preview screen where the position of the item 639 is changed by 100 depending on the drag to the upper or upward direction to overlap the item list as illustrated in FIG. 8A.

Figure 8B:
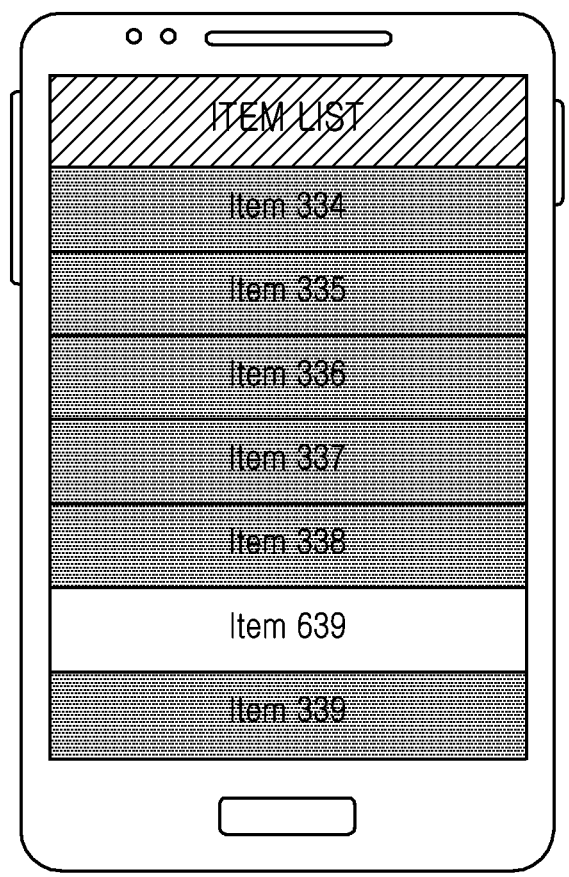

In the case where a drag of the item 639 to a right direction is detected as illustrated in FIG. 5B, the electronic device may allow a preview screen where the position of the item 639 is changed by 200 depending on the drag to the right direction to overlap the item list as illustrated in FIG. 8B.

Figure 8C:
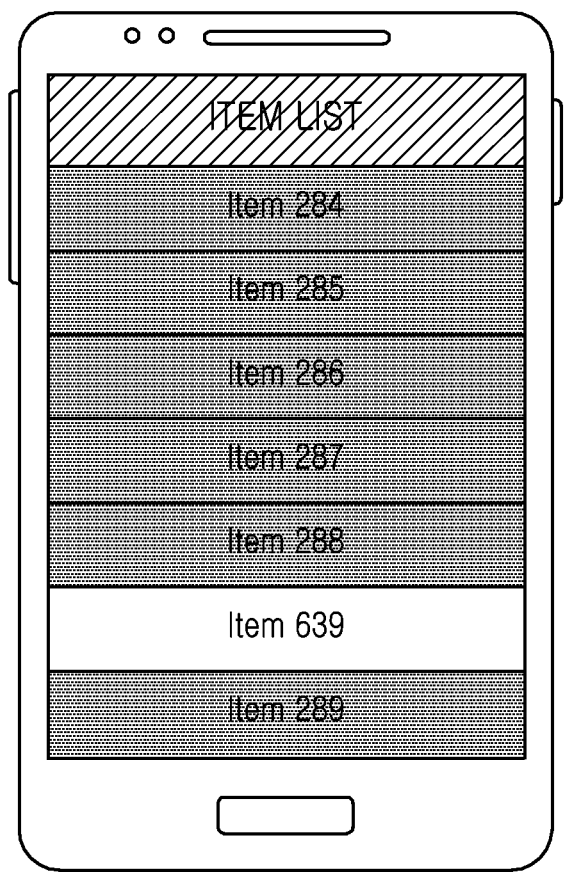

In the case where a drag of the item 639 to a left direction is detected as illustrated in FIG. 5C, the electronic device may allow a preview screen where the position of the item 639 is changed by 50 depending on the drag to the left direction to overlap the item list as illustrated in FIG. 8C.

Figure 8D:
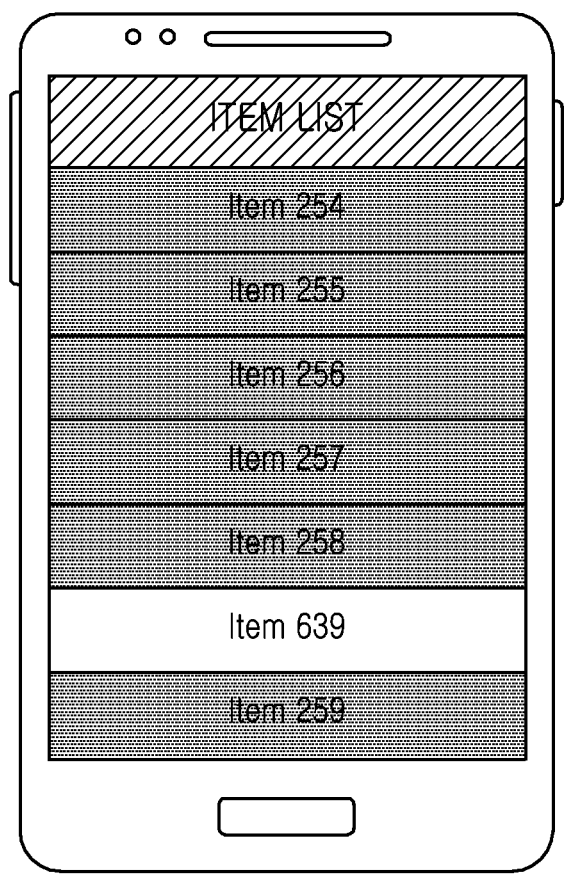

In the case where a drag of the item 639 to a lower direction is detected as illustrated in FIG. 5D, the electronic device may allow a preview screen where the position of the item 639 is changed by 30 depending on the drag to the lower or downward direction to overlap the item list as illustrated in FIG. 8D.

As described above, the electronic device may display a preview screen for changing an object on the display unit 152 so that a user may easily recognize the changed position of the object depending on a drag direction. At this point, the electronic device may display the preview screen on the display unit 152 while a drag for changing the position of the object is detected. For example, when a drag of an object starts to be detected, the electronic device may display a preview screen for the object with consideration of a drag direction. In the case where a touch of an object is released, the electronic device may change the position of the object to a position displayed on the preview screen.

Figure 7E:
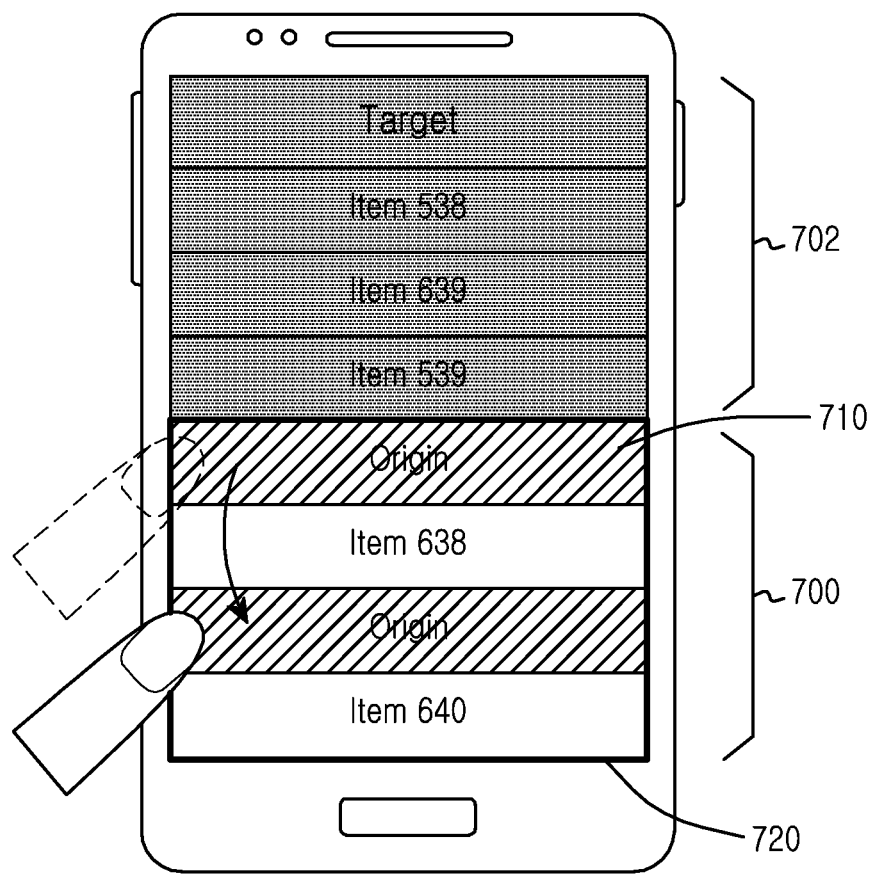

Additionally, in case of displaying the preview screen, the electronic device may maintain the preview screen until a movement completion event occurs. For example, in the case where a drag of an object is detected, the electronic device may display the preview screen for the object with consideration of the drag direction. After that, as illustrated in FIG. 7E, in the case where a drag of a division line 710 between an item list 700 and a preview screen 702 to a lower end 720 of the screen is detected, the electronic device may recognize a movement completion event occurs and change the position of an object to a position displayed on the preview screen. At this point, in the case where the division line 710 between the item list 700 and the preview screen 702 is selected, the electronic device may display the outline of the item list 700 using a bold line in order to represent selection of the division line 710. Additionally, the electronic device may determine whether a movement completion event occurs with consideration of at least one of touch information, icon selection, and hardware button input.

Figure 7F:
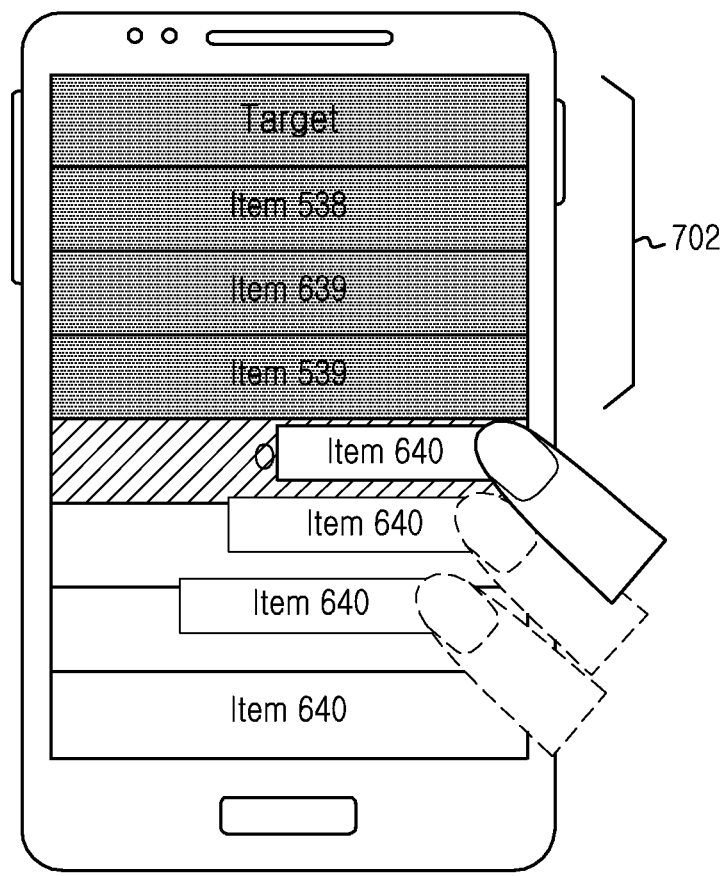

As described above, in case of maintaining the preview screen until a movement completion event occurs, the electronic device may move the position of a different item included in the item list 700 using the preview screen 702. For example, in the case where a drag of the item 639 to an upper or upward direction is detected as illustrated in FIG. 5A, the electronic device may display the preview screen 702 for the item 639 as illustrated in FIG. 7A. At this point, the electronic device may change the position of the item 640 included in the item list 700 by moving the position of the item 640 to the preview screen 702 from the item list 700 as illustrated in FIG. 7F.

As described above, the electronic device may divide a display region according to a first preview display method to display a preview screen (FIG. 7A to FIG. 7F), or may display the preview screen so that it overlaps an object list according to a second preview display method such as depicted in (FIGS. 8A and 8B). At this point, the electronic device may selectively use the first preview display method and the second preview display method depending on a display shape of the display unit 152. For example, in the case where the display unit 152 of the electronic device is long in a vertical direction (portrait), the electronic device may display the preview screen so that it overlaps the item list according to the second preview display method. In contrast, in the case where the display unit 152 is changed to a shape long in a horizontal direction (horizontal) depending on rotation of the electronic device, the electronic device may divide a display region to display the preview screen according to the first preview display method.

FIGS. 9A to 9D illustrate screen configuration for changing the position of an object with consideration of a touch maintain time in an electronic device according to an embodiment of the present invention.

Figure 9A:
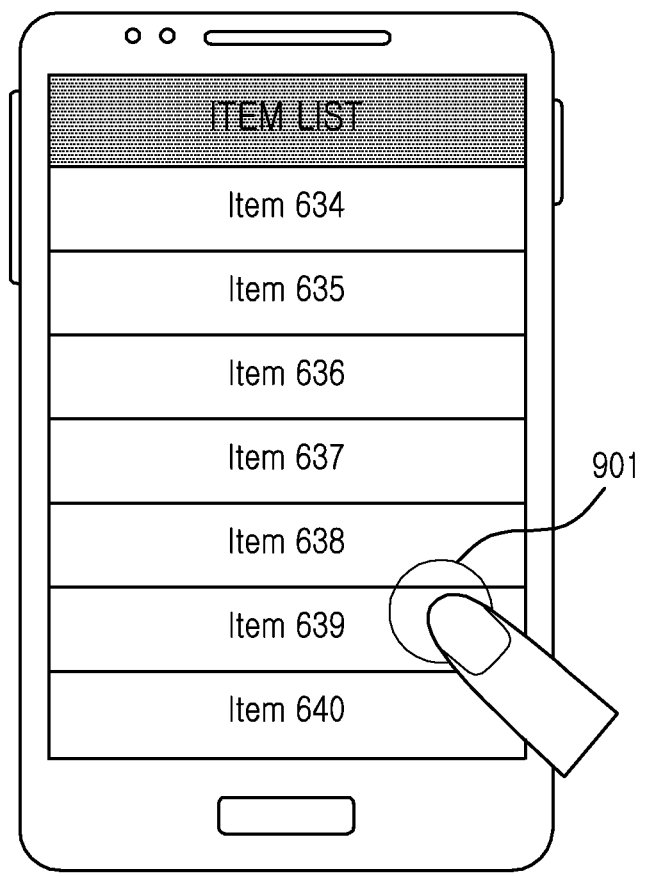
FIGS. 9A, 9B, 9C and 9D are views illustrating screen configuration for changing the position of an object with consideration of a touch maintain time in an electronic device according to an embodiment of the present invention.

To provide a service corresponding to an application, the electronic device may display an item list on the display unit 152 as illustrated in FIG. 9A. In the description below, it may be assumed that the electronic device changes the position of an item to an upper or upward direction.

Figure 9B:
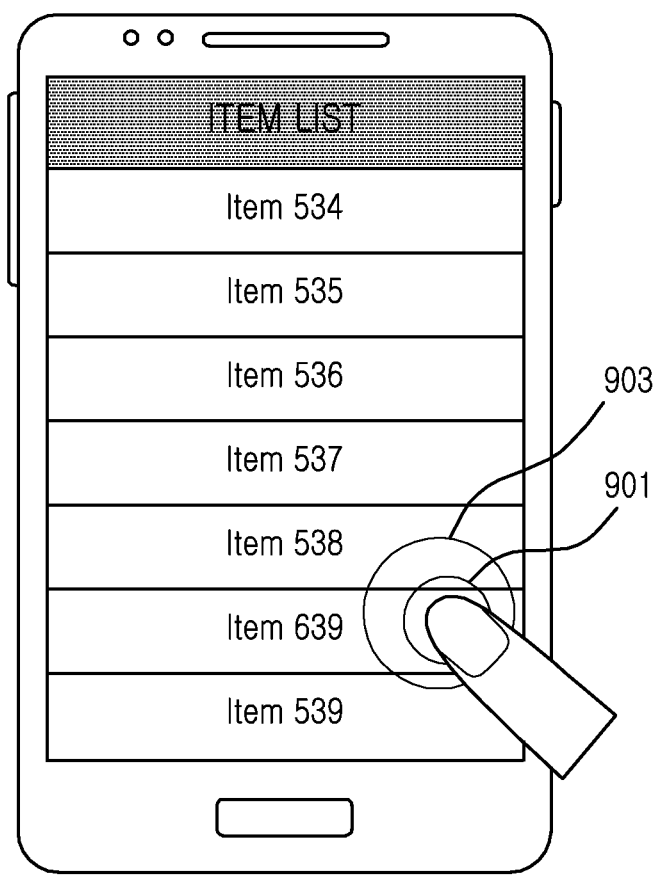

In the case where a touch of an item 639 is detected from the item list illustrated in FIG. 9A, the electronic device may determine a touch maintain time of the item 639. At this point, the electronic device may display a touch maintain time 901 on a reference time basis so that a user may determine the touch maintain time of the item 639. In the case where a touch of the item 639 is maintained for a first reference time 901 in FIG. 9A, the electronic device may change the position of the item 639 to an upper direction by 100 predetermined units depending on object movement interval information corresponding to the first reference time 901. Accordingly, the electronic device may display the item 639 of the changed position on the display unit 152 as illustrated in FIG. 9B. Here, the reference time may include at least one of time bases which the object movement intervals match.

In the case where a touch of the item 639 is maintained in FIG. 9B, the electronic device may display touch maintain times 901 and 903 so that a user may determine a touch maintain time of the item 639. In the case where a touch of the item 639 is maintained for a second reference time 903, the electronic device may change the position of the item 639 to an upper direction by 200 predetermined units depending on object movement interval information corresponding to the second reference time 903. Accordingly, the electronic device may display the item 639 of the changed position on the display unit 152 as illustrated in FIG. 9C, in other words, more particularly, in FIG. 9B, Item 639 is positioned between Item 538 and 539, while in FIG. 9C, Item 639 is positioned between Item 338 and 339, thus a changed position of 200 units.

Figure 9C:
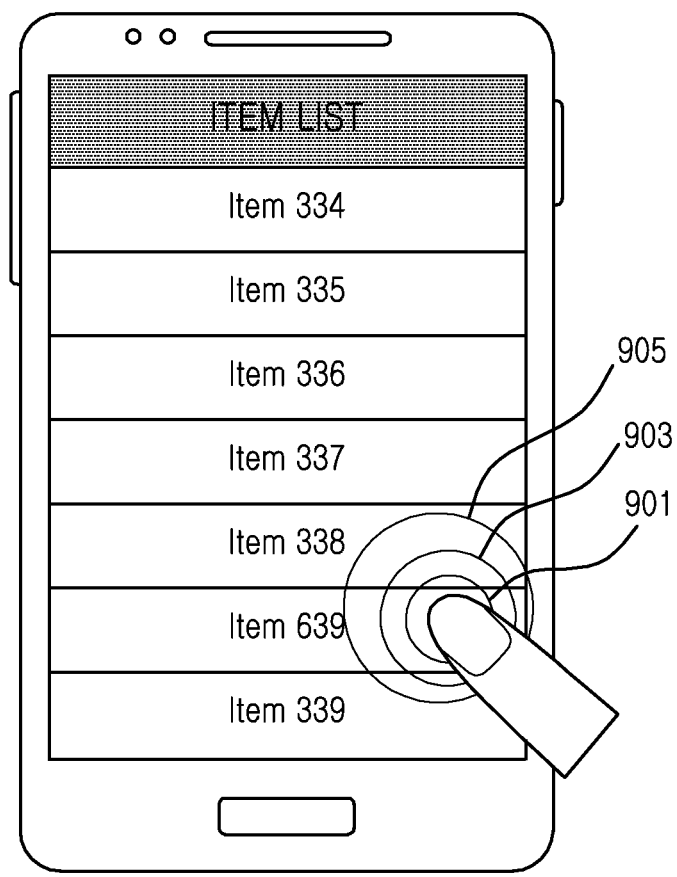

In the case where a touch of the item 639 is maintained in FIG. 9C, the electronic device may display touch maintain times 901, 903, and 905 so that a user may determine a touch maintain time of the item 639. In the case where a touch of the item 639 is maintained for a third reference time 905, the electronic device may change the position of the item 639 to the upper or upward direction by 50 predetermined units depending on object movement interval information corresponding to the third reference time 905. Accordingly, the electronic device may display the item 639 of the changed position on the display unit 152 as illustrated in FIG. 9D, in other words, more particularly, in FIG. 9C, Item 639 is positioned between Items 338 and 339, while in FIG. 9D, Item 639 is positioned between items 288 and 289, thus a changed position of 50 units.

Figure 9D:
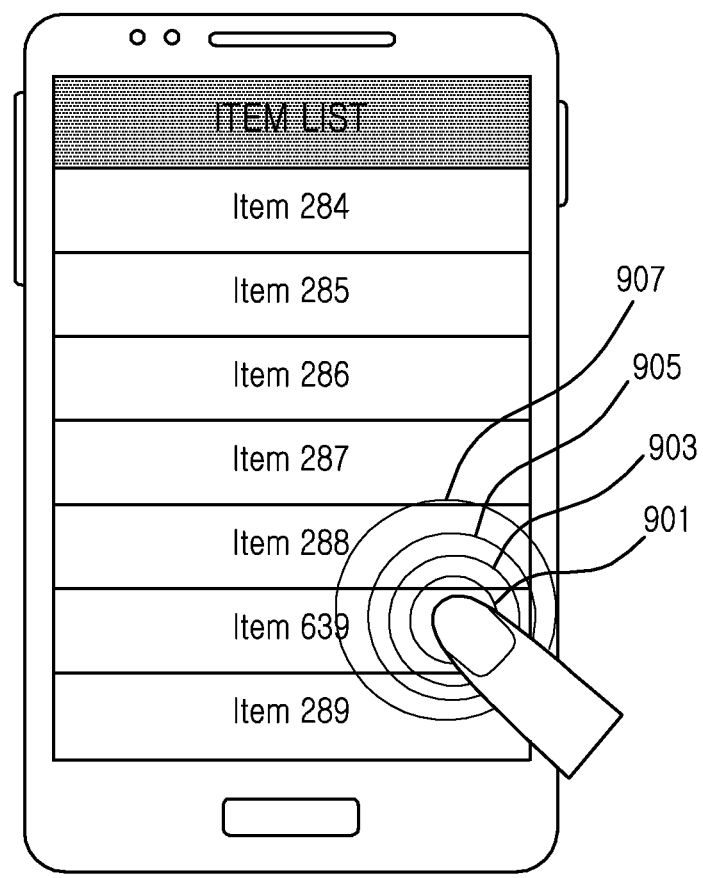

In the case where a touch of the item 639 is maintained in FIG. 9D, the electronic device may display touch maintain times 901, 903, 905, and 907 so that a user may determine a touch maintain time of the item 639. In the case where a touch of the item 639 is maintained for a fourth reference time 907, the electronic device may change the position of the item 639 to the upper or upward direction by 30 predetermined units depending on object movement interval information corresponding to the fourth reference time 907. Accordingly, the electronic device may display the item 639 of the changed position on the display unit 152 as illustrated in FIG. 5E, in other words, more particularly, in FIG. 9D, Item 639 is positioned between Item 288 and 289, while in FIG. 5E, Item 639 is positioned between Item 258 and 259, thus a changed position of 30 units.

As described above, the electronic device may change the position of an object with consideration of a touch maintain time of the object. At this point, the electronic device may display a preview screen for the touched object on the display unit 152 so that a user may determine the position to which the object is to move depending on a touch maintain time. For example, as illustrated in FIG. 9A, in the case where a touch maintain time of the item 639 exceeds the first reference time 901, the electronic device may display a preview screen where the position of the item 639 is changed by 100 from the item list depending on the first reference time 901 as illustrated in FIG. 7A or 8A. In the case where a touch of the item 639 is released with the preview screen corresponding to the first reference time 901 displayed, the electronic device may recognize the touch of the item 639 is maintained for the first reference time 901. Accordingly, the electronic device may change the position of the item 639 to the upper or upward direction by 100 predetermined units.

For another example, as illustrated in FIG. 9B, in the case where the touch maintain time of the item 639 exceeds the second reference time 903, the electronic device may display a preview screen where the position of the item 639 is changed by 200 from the item list depending on the second reference time 903 as illustrated in FIG. 7B or 8B. That is, in the case where the touch maintain time of the item 639 exceeds the second reference time 903, the electronic device may switch the preview screen corresponding to the first reference time 901 to the preview screen corresponding to the second reference time 903.

In the case where a touch of the item 639 is released with the preview screen corresponding to the second reference time 903 displayed, the electronic device may recognize the touch of the item 639 is maintained for the second reference time 903. Accordingly, the electronic device may change the position of the item 639 to the upper or upward direction by 200 predetermined units.

FIGS. 10A to 10D illustrate screen configuration for changing the position of an object with consideration of a drag distance in an electronic device according to an embodiment of the present invention.

Figure 10A:
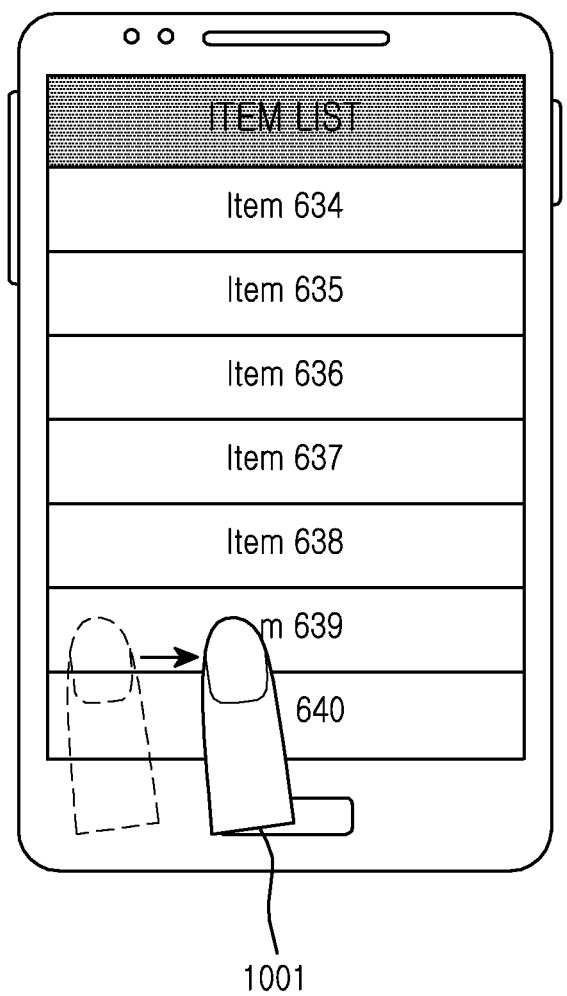
FIGS. 10A, 10B, 10C and 10D are views illustrating screen configuration for changing the position of an object with consideration of a drag distance in an electronic device according to an embodiment of the present invention.

To provide a service corresponding to an application, the electronic device may display an item list on the display unit 152 as illustrated in FIG. 10A. In the description below, it may be assumed that the electronic device changes the position of an item to the upper or upward direction.

Figure 10B:
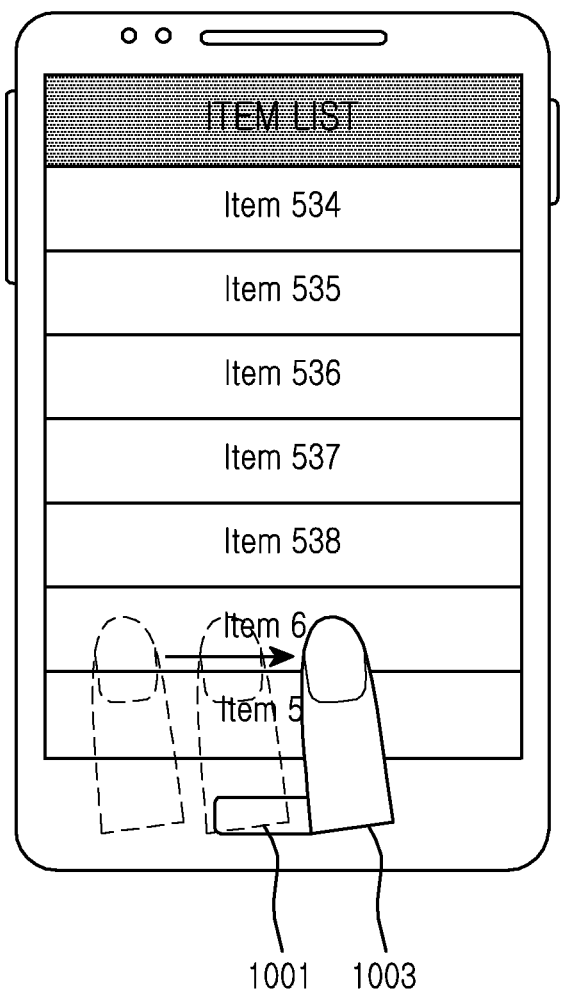

In the case where a drag of the item 639 is detected from the item list illustrated in FIG. 10A, the electronic device may determine a drag distance of the item 639. At this point, the electronic device may display a drag distance 1001 on a reference distance basis so that a user may determine the drag distance of the item 639. In the case where the item 639 is dragged by a first reference distance 1001, the electronic device may change the position of the item 639 to the upper or upward direction by 100 depending on object movement interval information corresponding to the first reference distance 1001. Accordingly, the electronic device may display the item 639 of the changed position on the display unit 152 as illustrated in FIG. 10B. Here, the reference distance may include at least one of distance bases which object movement intervals match.

Figure 10C:
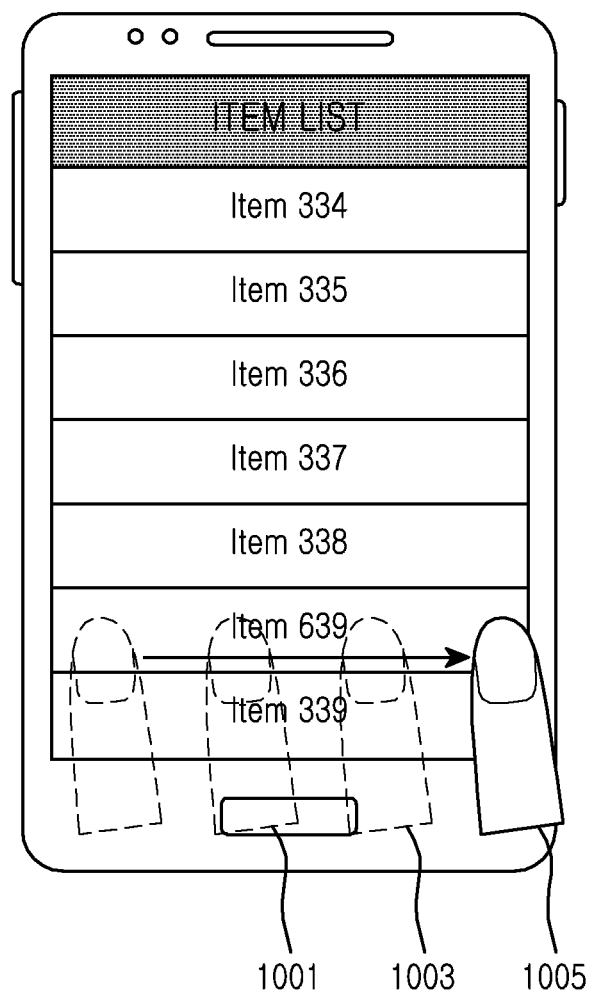

In the case where a drag of the item 639 is maintained in FIG. 10B, the electronic device may display drag distances 1001 and 1003 so that a user may determine the drag distance of the item 639. In the case where the item 639 is dragged by a second reference distance 1003, the electronic device may change the position of the item 639 to the upper or upward direction by 200 predetermined units depending on object movement interval information corresponding to the second reference distance 1003. Accordingly, the electronic device may display the item 639 of the changed position on the display unit 152 as illustrated in FIG. 10C. In other words, when the drag of item 639 is maintained for one of a drag distance 1001 or 1003, the item 639 is changed for example to an upward direction by 200 predetermined units.

Figure 10D:
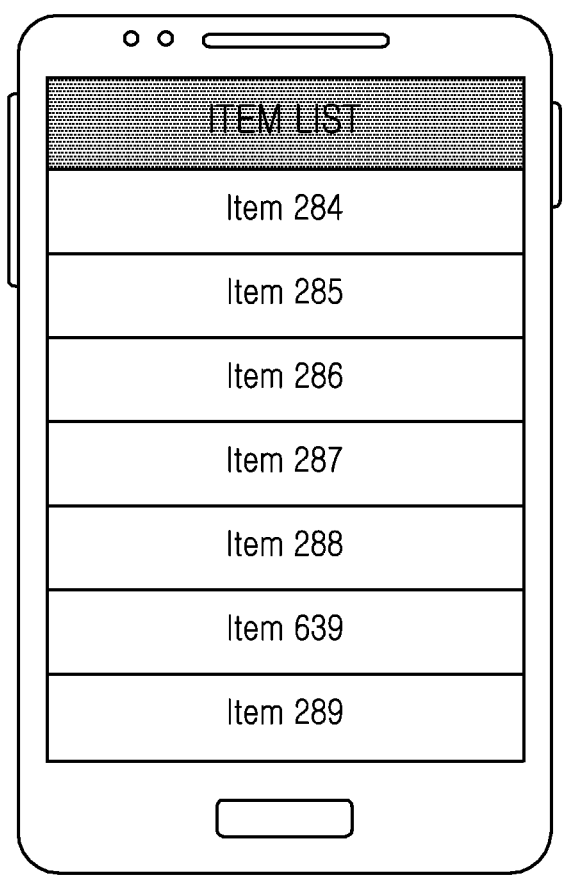

In the case where a drag of the item 639 is maintained in FIG. 10C, the electronic device may display drag distances 1001, 1003, and 1005 on a reference time basis so that a user may determine the drag distance of the item 639. In the case where the item 639 is dragged by a third reference distance 1005, the electronic device may change the position of the item 639 to the upper direction by 50 predetermined units depending on object movement interval information corresponding to the third reference distance 1003. Accordingly, the electronic device may display the item 639 of the changed position on the display unit 152 as illustrated in FIG. 10D.

As described above, the electronic device may change the position of an object with consideration of the drag distance of the object. At this point, the electronic device may display a preview screen for a touched object on the display unit 152 so that the user may determine a position to which the object is to move depending on the drag distance in advance. For example, in the case where the drag distance of the item 639 exceeds a first reference distance 1001 as illustrated in FIG. 10A, the electronic device may display a preview screen where the position of the item 639 is changed by 100 predetermined units depending on the first reference distance 1001 from the item list as illustrated in FIG. 7A or 8A. In the case where a touch of the item 639 is released with the preview screen corresponding to the first reference distance 1001 displayed, the electronic device may recognize the item 639 is dragged by the first reference distance 1001 to change the position of the item 639 to the upper or upward direction by 100 predetermined units For another example, in the case where the drag distance of the item 639 exceeds a second reference distance 1003 as illustrated in FIG. 10B, the electronic device may display a preview screen where the position of the item 639 is changed by 200 predetermined units depending on the second reference distance 1003 from the item list as illustrated in FIG. 7B or 8B. That is, in the case where the drag distance of the item 639 exceeds the second reference distance 1003, the electronic device may switch the preview screen corresponding to the first reference distance 1001 to the preview screen corresponding to the second reference distance 1003.

In the case where a touch of the item 639 is released with the preview screen corresponding to the second reference distance 1003 displayed, the electronic device may recognize the item 639 is dragged by the second reference distance 1003 and change the position of the item 639 to the upper direction by 200 predetermined units.

Figure 11A:
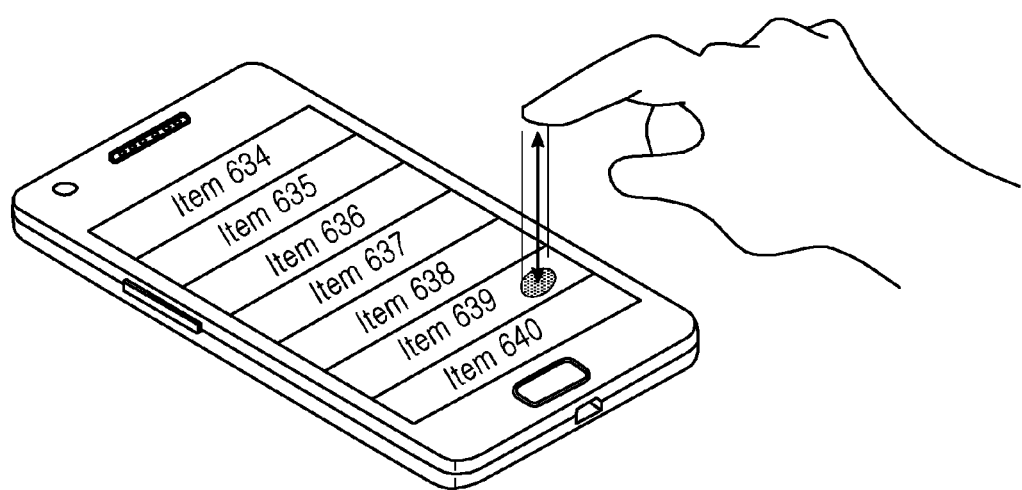
FIGS. 11A, 11B and 11C are views illustrating screen configuration for changing the position of an object with consideration of a touch frequency in an electronic device according to an embodiment of the present invention.
Figure 11B:
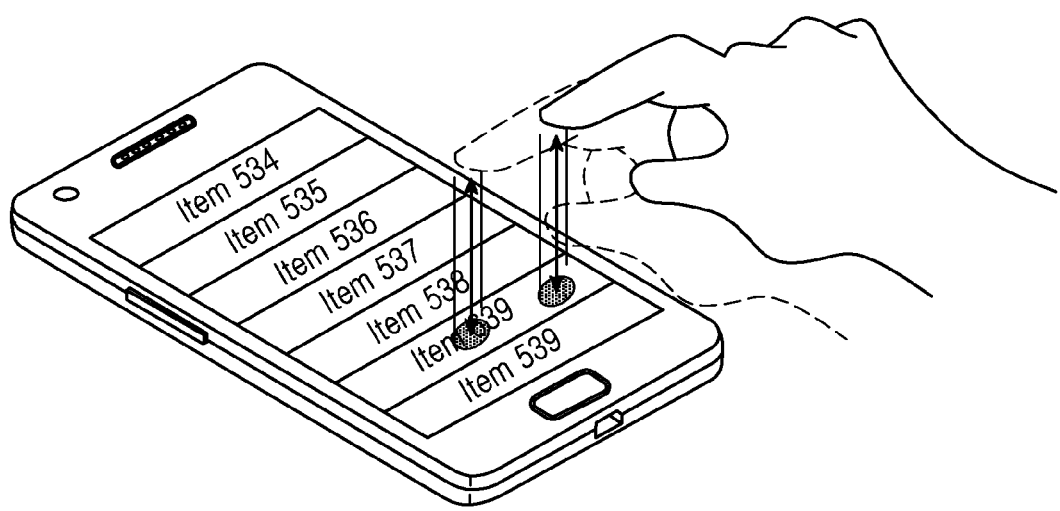
Figure 11C:
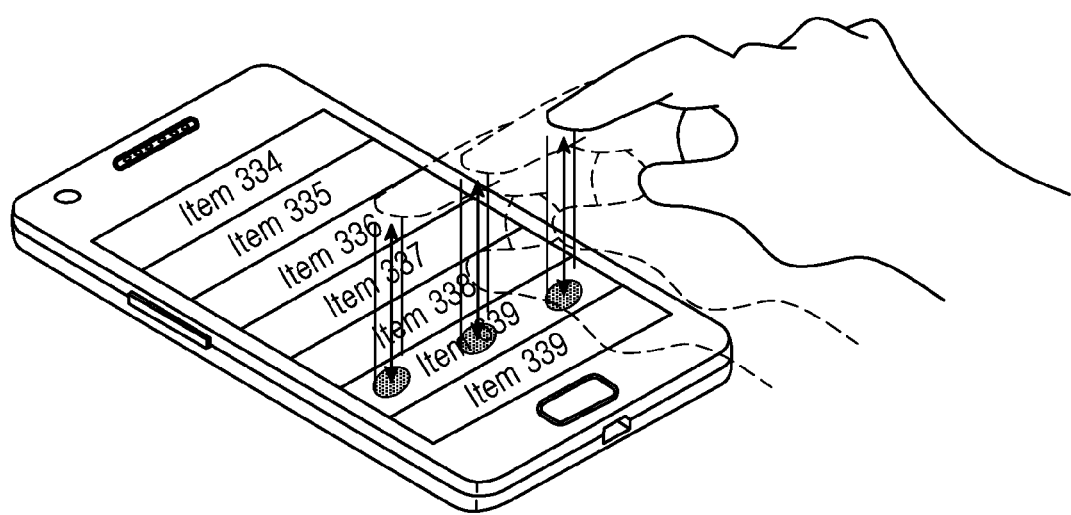

FIGS. 11A to 11C illustrate screen configuration for changing the position of an object with consideration of a touch frequency in an electronic device according to an embodiment of the present invention.

To provide a service corresponding to an application, the electronic device may display an item list on the display unit 152 as illustrated in FIG. 11A. In the description below, it may be assumed that the electronic device changes the position of an item to an upper direction.

In the case where a touch of the item 639 is detected from the item list illustrated in FIG. 11A, the electronic device may determine a touch frequency of the item 639. For example, the electronic device may determine a touch frequency of the item 639 detected for a reference time after a first touch of the item 639 is detected. For another example, the electronic device may determine a touch frequency of the item 639 additionally detected within a reference time after a touch of the item 639 is detected.

In the case where the item 639 is touched one time, the electronic device may change the position of the item 639 to the upper or upward direction by 100 predetermined units depending on object movement interval information corresponding to the one time of touch. Accordingly, the electronic device may display the item 639 of the changed position on the display unit 152 as illustrated in FIG. 11B.

In the case where a touch of the item 639 is detected from the item list illustrated in FIG. 11B, the electronic device may determine a touch frequency of the item 639. In the case where the item 639 is touched two times, the electronic device may change the position of the item 639 to the upper or upward direction by 200 predetermined units depending on object movement interval information corresponding to the two times of touch. Accordingly, the electronic device may display the item 639 of the changed position on the display unit 152 as illustrated in FIG. 11C.

In the case where a touch of the item 639 is detected from the item list illustrated in FIG. 11C, the electronic device may determine a touch frequency of the item 639. In the case where the item 639 is touched three times, the electronic device may change the position of the item 639 to the upper or upward direction by 50 predetermined units depending on object movement interval information corresponding to the three times of touch. Accordingly, the electronic device may display the item 639 of the changed position on the display unit 152 as illustrated in FIG. 10D.

As described above, the electronic device may change the position of an object with consideration of a touch frequency of the object. At this point, the electronic device may display a preview screen of the touched object on the display unit 152 so that a user may determine a position to which the object is to move depending on the touch frequency in advance. At this point, the electronic device may display the preview screen for a reference display time set in advance after detecting a touch frequency of the object.

Figure 12:
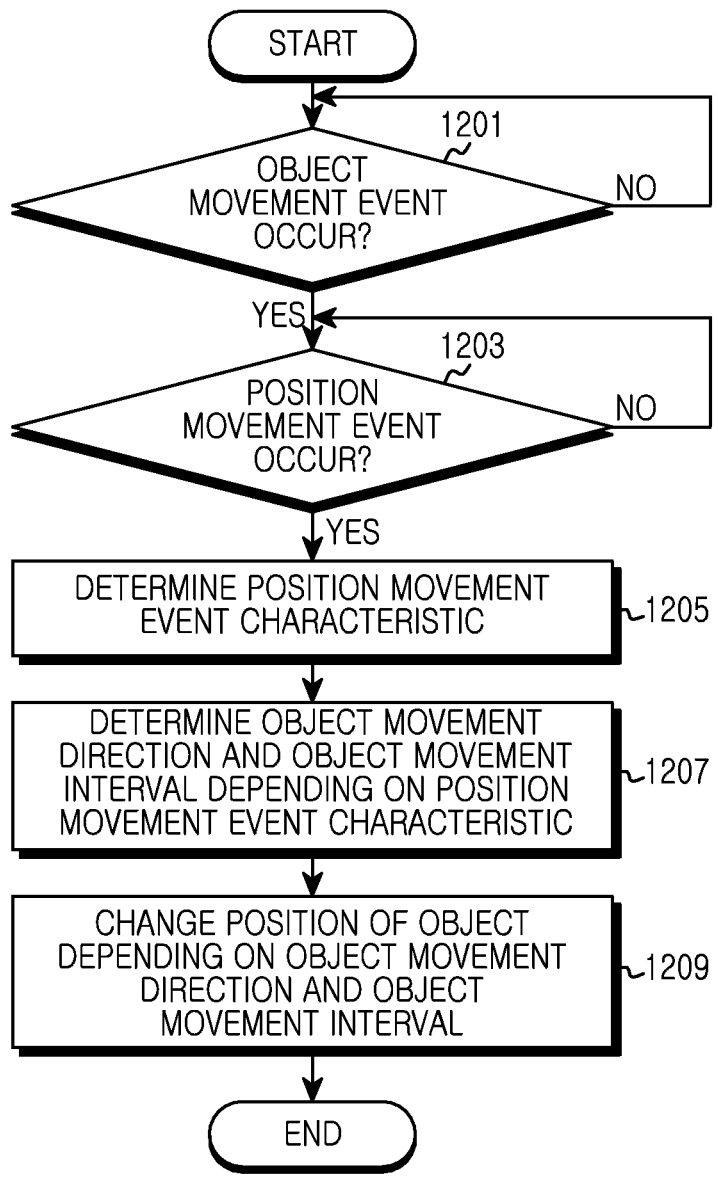
FIG. 12 is a flowchart for changing the position of an object depending on a position movement event characteristic in an electronic device according to an embodiment of the present invention.

FIG. 12 illustrates a procedure for changing the position of an object depending on a position movement event characteristic in an electronic device according to an embodiment of the present invention.

Referring to FIG. 12, the electronic device may determine whether an object movement event occurs in step 1201. For example, the electronic device may determine whether an object movement event occurs using at least any one of a hardware button input, icon selection, motion detection of the electronic device, user gesture detection, and object selection.

In the case where an object movement event occurs, the electronic device may proceed to step 1203 to determine whether a position movement event for a first object occurs. For example, the electronic device may determine whether a drag of the first object is detected from an object list displayed on the display unit 152.

In the case where the position movement event occurs, the electronic device may proceed to step 1205 to determine the characteristic of the position movement event. For example, the electronic device may determine a drag direction and a drag region of the first object. For another example, the electronic device may determine a drag angle of the first object. For still another example, the electronic device may determine a drag direction of the first object.

After that, the electronic device may proceed to step 1207 to determine an object movement interval and an object movement direction depending on a position change event characteristic. For example, the electronic device may determine an object movement interval that has changed the position of the first object with consideration of the drag region of the first object. At this point, the electronic device may recognize a drag direction detected via a drag region as an object movement direction. For another example, the electronic device may determine an object movement interval and an object movement direction that have changed the position of the first object with consideration of a drag angle of the first object. For still another example, the electronic device may determine an object movement direction and an object movement interval mapped to the drag direction of the first object. In other words, the electronic device may recognize from a detected drag direction via a drag region as a direction for moving of the object.

After determining the object movement interval and the object movement direction, the electronic device may proceed to step 1209 to change the position of the first object to an object movement direction depending on a position movement event characteristic by the object movement interval. For example, the electronic device may jump to the object movement direction by the object movement interval depending on the related position movement event characteristic to change the position of the first object.

The electronic device may also change the position of an object with consideration of the drag angle of the object as illustrated in FIGS. 13A to 13C or FIGS. 14A to 14C.

Figure 13A:
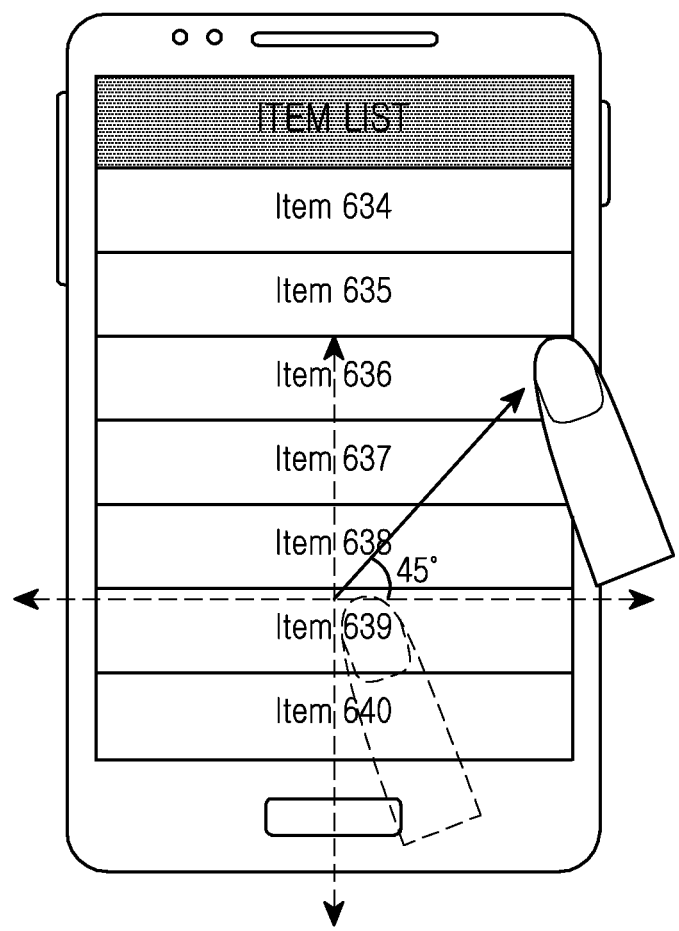
FIGS. 13A, 13B and 13C are views illustrating screen configuration for changing the position of an object with consideration of a drag angle in an electronic device according to an embodiment of the present invention.
Figure 13B:
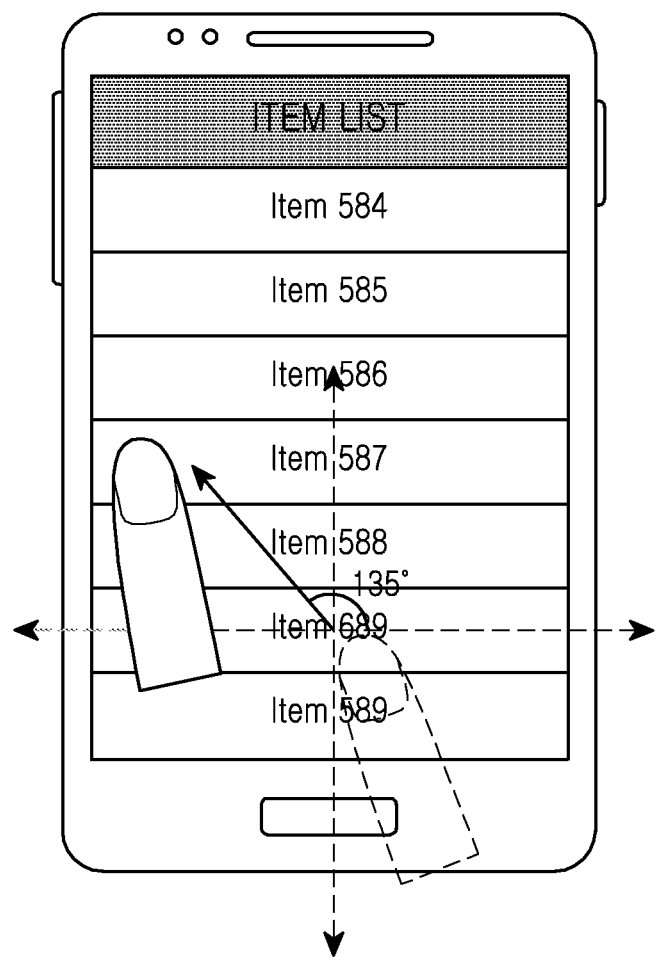
Figure 13C:
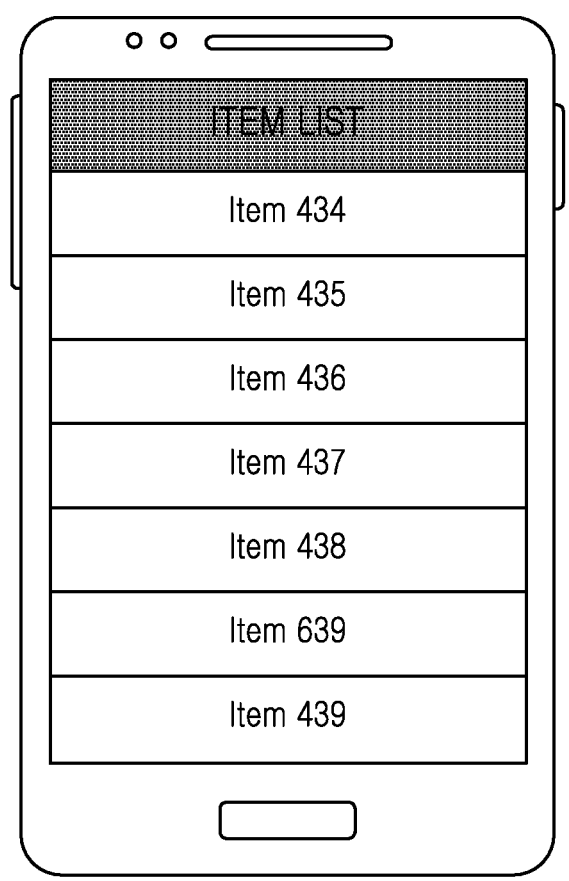

FIGS. 13A to 13C illustrate screen configuration for changing the position of an object with consideration of a drag angle in an electronic device according to an embodiment of the present invention.

To provide a service corresponding to an application, the electronic device may display an item list on the display unit 152 as illustrated in FIG. 13A. At this point, the electronic device may change the position of at least one item included in an item list with consideration of an object movement interval mapped to a reference drag angle. For example, the description below may assume that an object movement interval of 1 is mapped to a drag angle of 0° and an object movement interval of 200 predetermined units is mapped to a drag angle of 180°. Also, it may be assumed that in the case where a drag angle is positioned between 0° and 180°, the electronic device may change the position of an object to the upper or upward direction, and in the case where a drag angle is positioned between 181° and 359°, the electronic device may change the position of an object to the lower or downward direction.

In the case where a drag of the item 639 is detected from the item list of FIG. 13A, the electronic device may determine the drag angle. In the case where the drag angle of the item 639 is 45°, the electronic device may recognize it changes the position of the item 639 to the upper or upward direction by 50 predetermined units with consideration of an object movement interval mapped to a reference drag angle. After that, the electronic device may change the position of the item 639 to the upper or upward direction by 50 predetermined units, and display the item 639 of the changed position on the display unit 152 as illustrated in FIG. 13B, in other words, more particularly, in FIG. 13A, Item 639 is positioned between Item 638 and 640, while in FIG. 13B, Item 639 is positioned between Item 588 and 589, thus a changed position of 50 units.

In the case where a drag of the item 639 is detected from the item list of FIG. 13B, the electronic device may determine a drag angle. In the case where the drag angle of the item 639 is 135°, the electronic device may recognize it changes the position of the item 639 to the upper or upward direction by 150 predetermined units, and display the item 639 of the changed position on the display unit 152 as illustrated in FIG. 13C. Specifically, on FIG. 13B, Item 639 is located on a list of items between Item's 588 and 589, whereas on FIG. 13C, Item 639 has moved in a upward direction to a changed position located on a list of items between Item 439 and Item 438, thus 150 units.

Figure 14A:
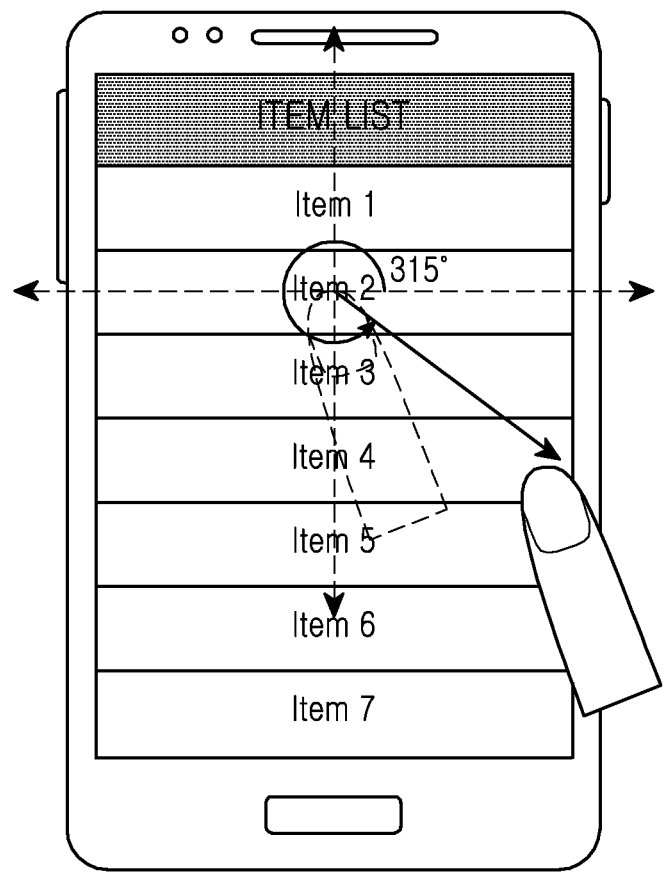
FIGS. 14A, 14B and 14C are views illustrating screen configuration for changing the position of an object with consideration of a drag angle in an electronic device according to another embodiment of the present invention.
Figure 14B:
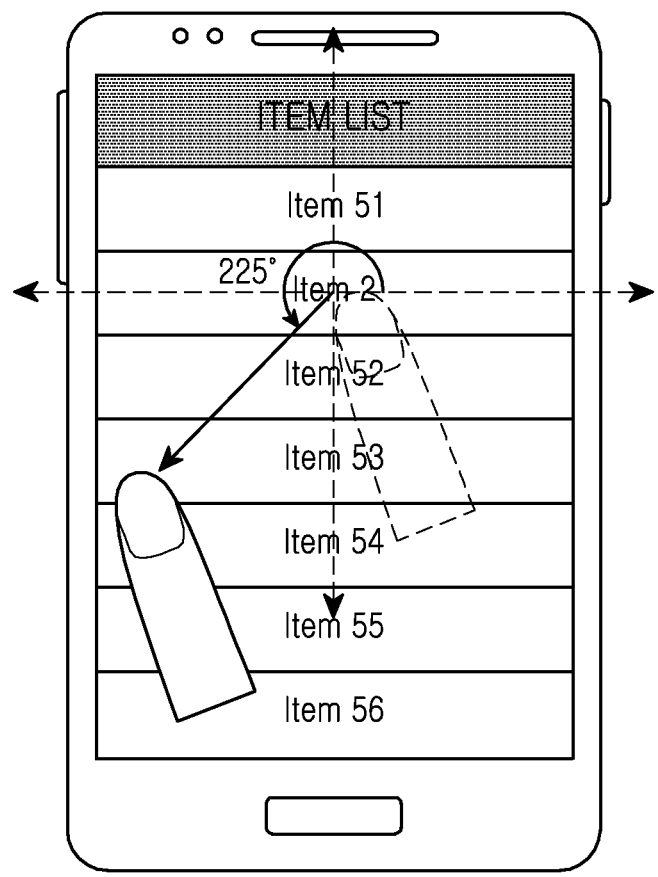
Figure 14C:
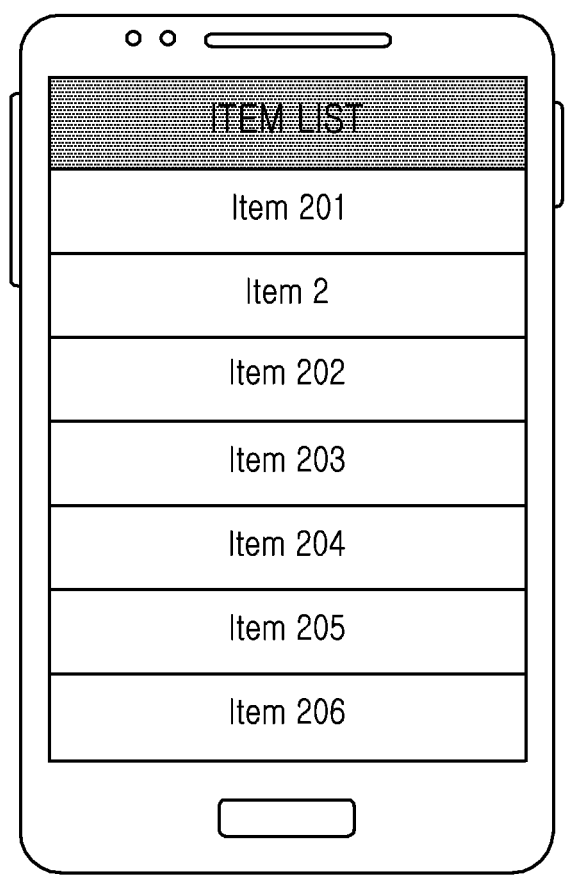

FIGS. 14A to 14C illustrate screen configuration for changing the position of an object with consideration of a drag angle operation in an electronic device according to another embodiment of the present invention.

To provide a service corresponding to an application, the electronic device may display an item list on the display unit 152 as illustrated in FIG. 14A. At this point, the electronic device may change the position of at least one item included in the item list with consideration of an object movement interval mapped to a reference drag angle. The description below may assume for example that an object movement interval of 1 predetermined units is mapped to a drag angle of 0° and an object movement interval of 200 predetermined units is mapped to a drag angle of 180°.

In the case where a drag of an item 2 is detected from the item list of FIG. 14A, the electronic device may determine a drag angle. In the case where the drag angle of the item 2 is 315°, the electronic device may recognize it changes the position of the item 2 to the upper or upward direction by 50 predetermined units with consideration of an object movement interval mapped to a reference drag angle. After that, the electronic device may change the position of the item 2 to the lower direction by 50 predetermined units, and display the item 2 of the changed position on the display unit 152 as illustrated in FIG. 14B. Specifically, on FIG. 14A, Item 2 is located on a list of items between Item's 1 and 2, whereas on FIG. 14B, Item 2 has moved in a upward direction to a changed position located on a list of items between Item 52 and Item 51 thus 50 units In the case where a drag of the item 2 is detected from the item list of items such as depicted on FIG. 14B, the electronic device may determine a drag angle. In the case where the drag angle of the item 2 is 225°, the electronic device may recognize it changes the position of the item 2 to the lower or downward direction by 150 predetermined units, and display the item 2 of the changed position on the display unit 152 as illustrated in FIG. 14C which can be seen by Item 2's position in the list of items. Specifically, on FIG. 14B, Item 2 is located on a list of items between Item's 51 and 52, whereas on FIG. 14C, Item 2 has moved in a downward direction to a changed position located on a list of items between Item 201 and item 202 thus 150 predetermined units.

As described above, when a drag of an object is detected, the electronic device may estimate an object movement interval corresponding to the drag angle to change the position of the dragged object. At this point, the electronic device may display a preview screen for the dragged object on the display unit 152 as illustrated in FIGS. 7A to 7F or FIGS. 8A to 8D so that a user may determine a position to which an object is to move depending on a dragged angle in advance. For example, the electronic device may display the preview screen for an object while the drag of the object is maintained thereby giving an advanced view of the final location of the dragged object.

FIGS. 15A to 15E illustrate screen configuration for changing the position of an object with consideration of a drag region in an electronic device according to another embodiment of the present invention.

Figure 15A:
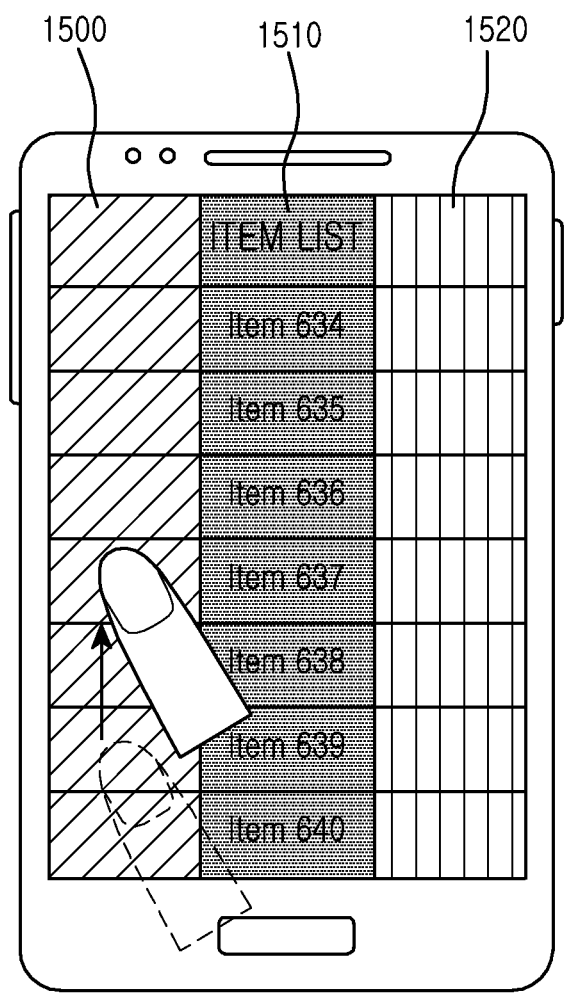
FIGS. 15A, 15B, 15C, 15D and 15E are views illustrating screen configuration for changing the position of an object with consideration of a drag region in an electronic device according to another embodiment of the present invention.

To provide a service corresponding to an application, the electronic device may display an item list on the display unit 152 as illustrated in FIG. 15A. In the case where an object movement event occurs, the electronic device may divide the display unit 152 into a plurality of regions 1500, 1510, and 1520 including different object movement intervals. The description below may assume that the electronic device divides the display unit 152 into three regions 1500, 1510, and 1520 including different object movement intervals, the first region 1500 includes an object movement interval of 100 predetermined units, the second region 1510 includes an object movement interval of 200 predetermined units, and the third region 1520 includes an object movement interval of 50 predetermined units.

In the case where a drag of the item 639 to the upper or upward direction via the first region 1500 is detected from the item list of FIG. 15A, the electronic device may change the position of the item 639 to the upper or upward direction by 100 predetermined units depending on object movement interval information corresponding to the first region 1500. Accordingly, the electronic device may display the item 639 of the changed position on the display unit 152 as illustrated in FIG. 3015B, in other words from between Item 538 and 539 to between items 339 and 338, thus 200 units as set forth as the object movement interval of 200 units for region 1510.

Figure 15B:
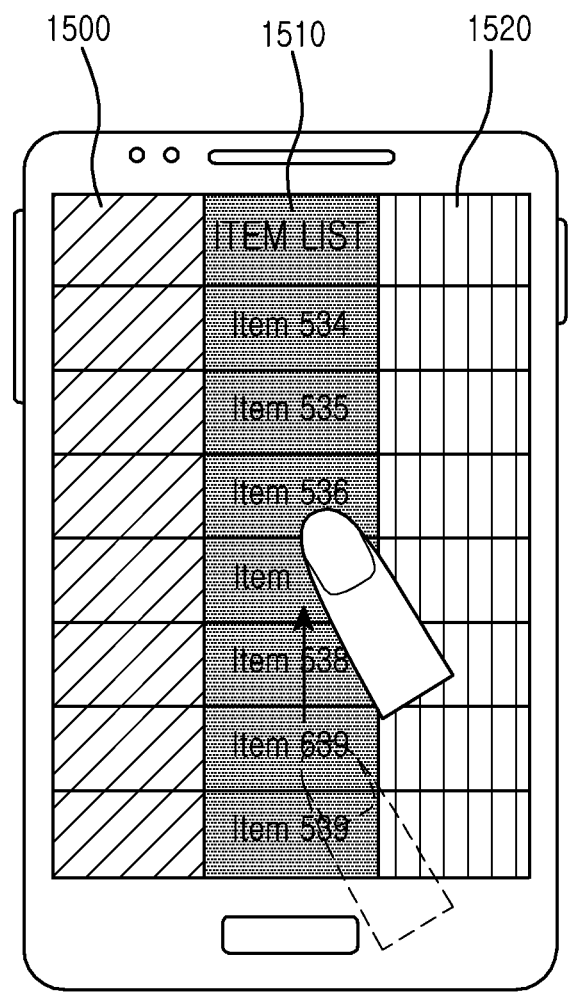

In the case where a drag of the item 639 to the upper or upward direction via the second region 1510 is detected from the item list of FIG. 15B, the electronic device may change the position of the item 639 to the upper or upward direction by 200 predetermined units depending on object movement interval information corresponding to the second region 1510. Accordingly, the electronic device may display the item 639 of the changed position on the display unit 152 as illustrated in FIG. 15C.

Figure 15C:
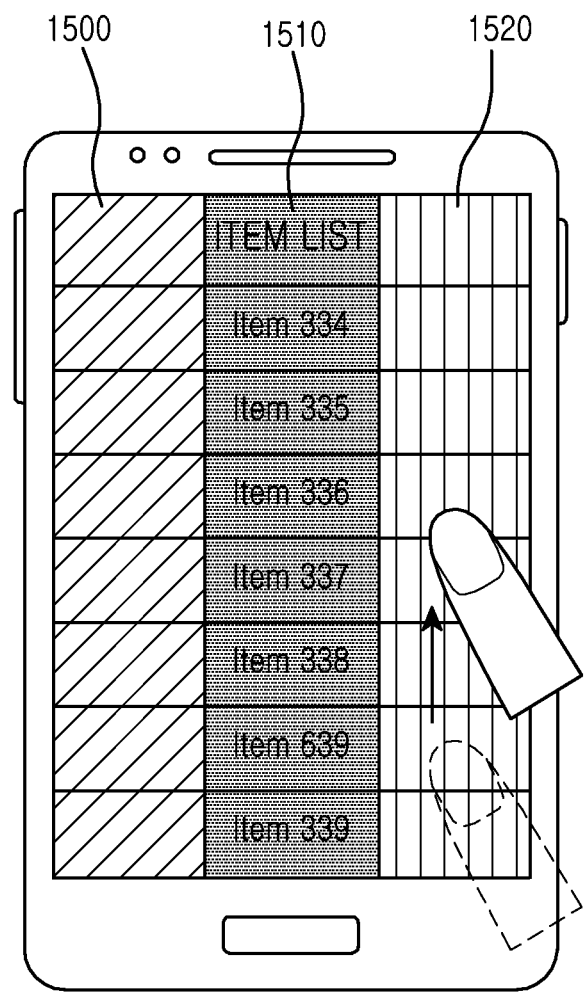

In the case where a drag of the item 639 to the upper or upward direction via the third region 1520 is detected from the item list of FIG. 15C, the electronic device may change the position of the item 639 to the upper or upward direction by 50 predetermined units depending on object movement interval information corresponding to the third region 1520. Accordingly, the electronic device may display the item 639 of the changed position on the display unit 152 as illustrated in FIG. 15D in other words from between 338 and 339 to between 288 and 289, thus 50 units.

Figure 15D:
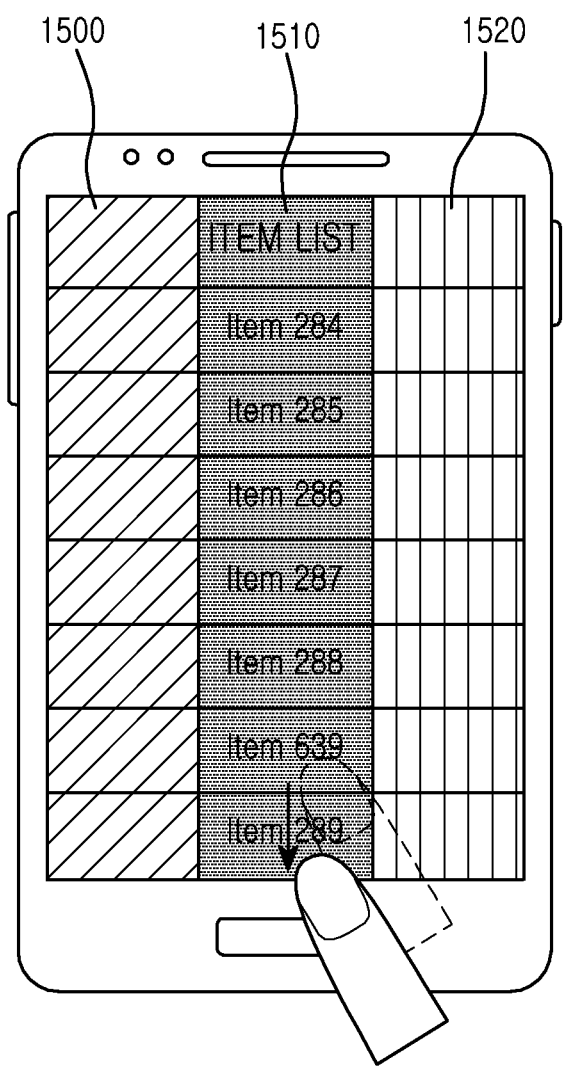
Figure 15E:
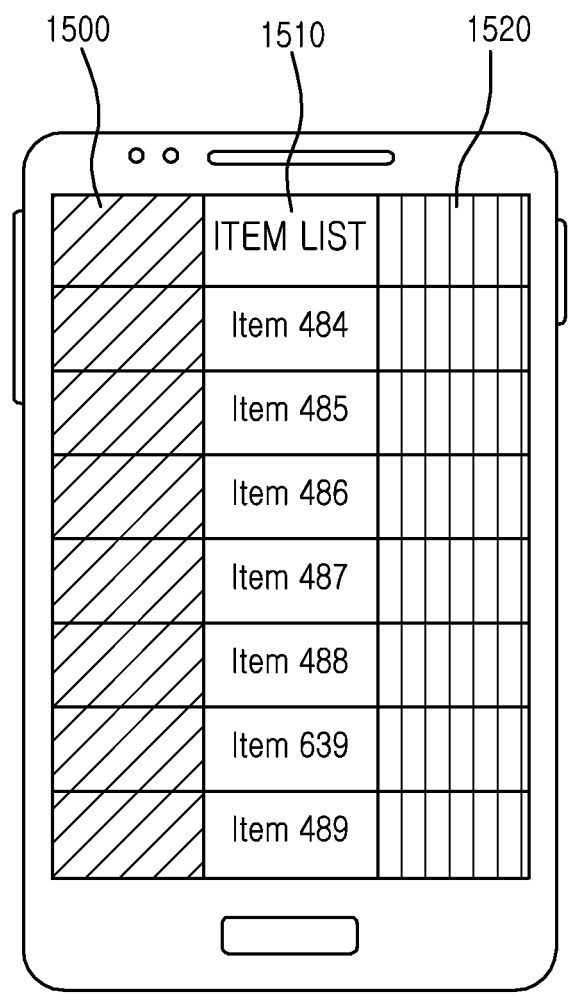

In the case where a drag of the item 639 to the lower or downward direction via the second region 1510 is detected from the item list of FIG. 15D, the electronic device may change the position of the item 639 to the lower or downward direction by 200 depending on object movement interval information corresponding to the second region 1510. Accordingly, the electronic device may display the item 639 of the changed position on the display unit 152 as illustrated in FIG. 15E, in other words from between items 288 and 289 in FIG. D to between 488 and 489, thus 200 units.

In the above embodiments, the electronic device may change the position of one of the objects displayed on the display unit 152 depending on the characteristic of a position movement event.

In another embodiment, the electronic device may change the positions of a plurality of objects among objects displayed on the display unit 152 depending on the characteristic of a position movement event. In this case, the electronic device may select at least one object whose position is to be changed before an object movement event 401 (1201) occurs and a position movement event 405 (1203) occurs in FIG. 4 or 12.

In the above embodiment, the electronic device may change the position of an object displayed on the display unit 152 depending on the characteristic of a position movement event.

In another embodiment, the electronic device may change a page of contents displayed on the display unit 152. For example, the electronic device may change the screen with consideration of a drag direction as illustrated in FIGS. 16A to 16E.

FIGS. 16A to 16E illustrate screen configuration for changing the position of an object with consideration of a drag direction in an electronic device according to another embodiment of the present invention.

Figure 16A:
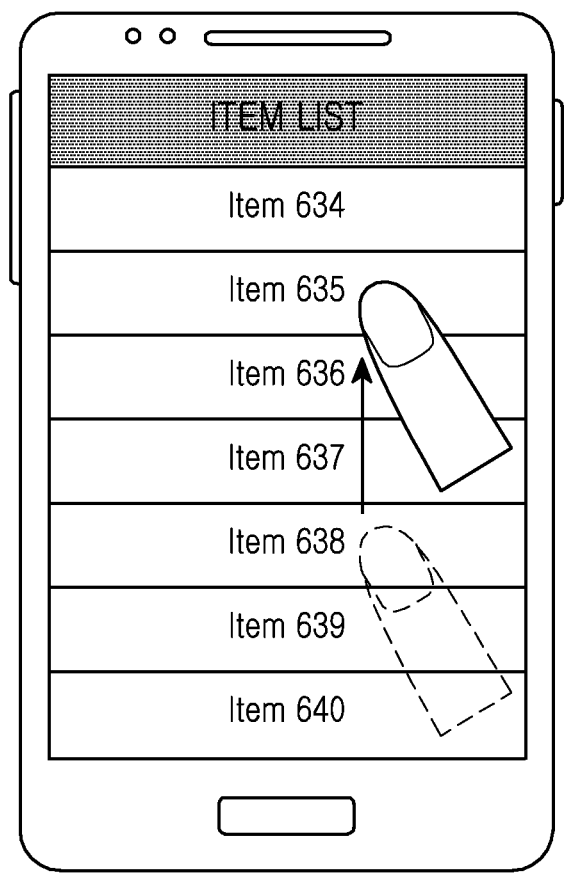
FIGS. 16A, 16B, 16C, 16D and 16E are views illustrating screen configuration for changing the position of an object with consideration of a drag direction in an electronic device according to another embodiment of the present invention.

To provide a service corresponding to an application, the electronic device may display an item list on the display unit 152 as illustrated in FIG. 16A. In the description below, it may be assumed that the electronic device changes a page of contents to the upper or upward direction depending on a drag direction of a display region.

In the case where a drag to the upper or upward direction is detected in the item list of FIG. 16A, the electronic device may change the item list displayed on the display unit 152 to the upper or upward direction by 100 predetermined units depending on object movement interval information corresponding to the drag to the upper or upward direction. Accordingly, the electronic device may display the changed item list on the display unit 152 as illustrated in FIG. 16B.

Figure 16B:
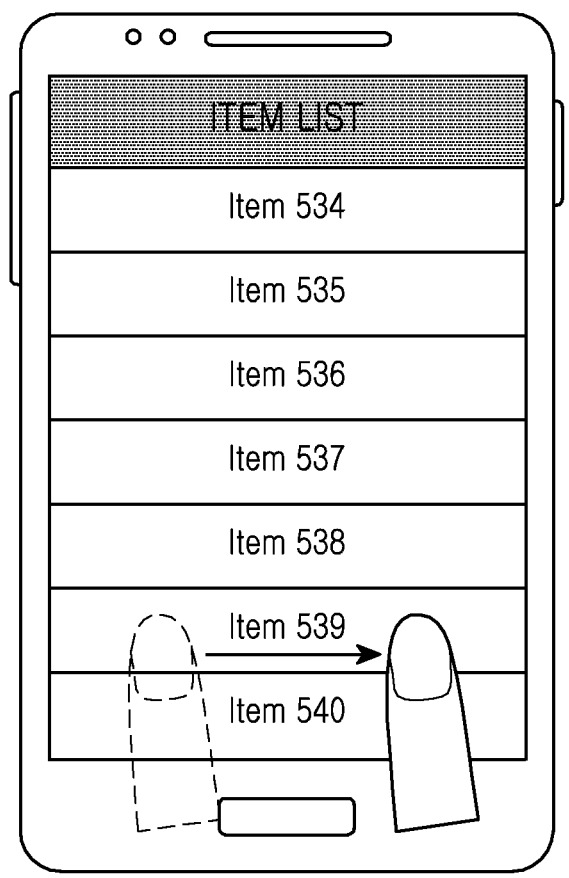
Figure 16C:
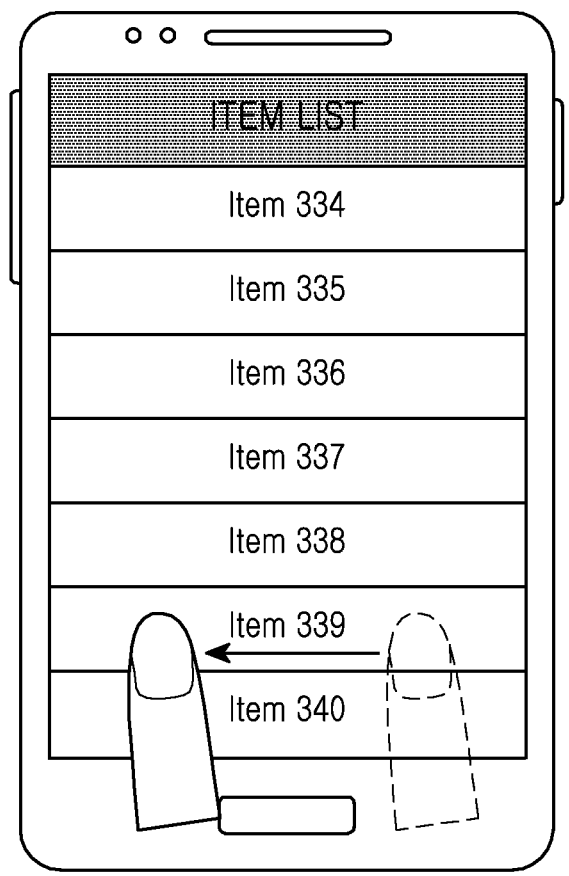

In the case where a drag to the right direction is detected in the item list of FIG. 16B, the electronic device may change the item list displayed on the display unit 152 to the upper or upward direction by 200 predetermined units depending on object movement interval information corresponding to the drag to the right direction. Accordingly, the electronic device may display the changed item list on the display unit 152 as illustrated in FIG. 16C, more specifically, note the change in Item List from Item 534 to Item 540 in FIG. 16B, to Item 334 to Item 340 in FIG. 16C.

In the case where a drag to the left direction is detected in the item list of FIG. 3016C, the electronic device may change the item list displayed on the display unit 152 to the upper or upward direction by 50 depending on object movement interval information corresponding to the drag to the left direction. Accordingly, the electronic device may display the changed item list on the display unit 152 as illustrated in FIG. 16D.

Figure 16D:
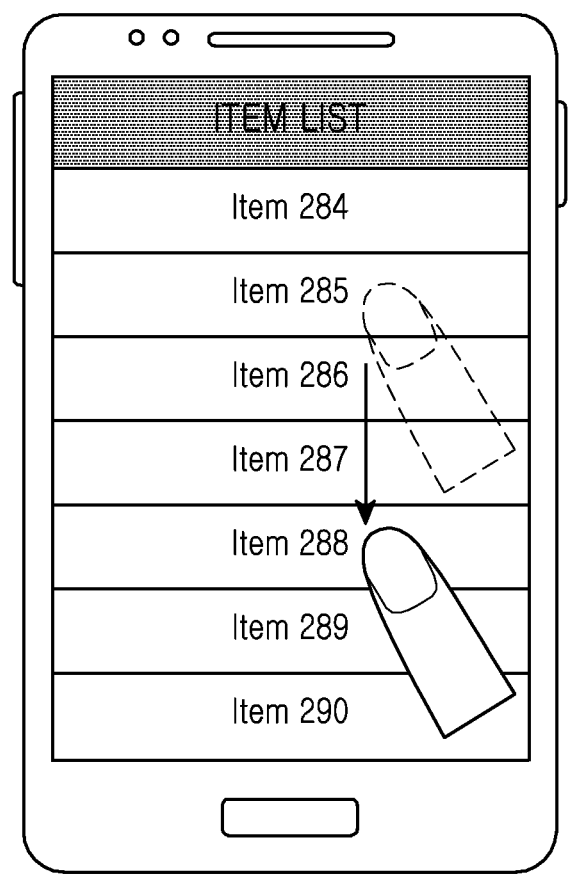
Figure 16E:
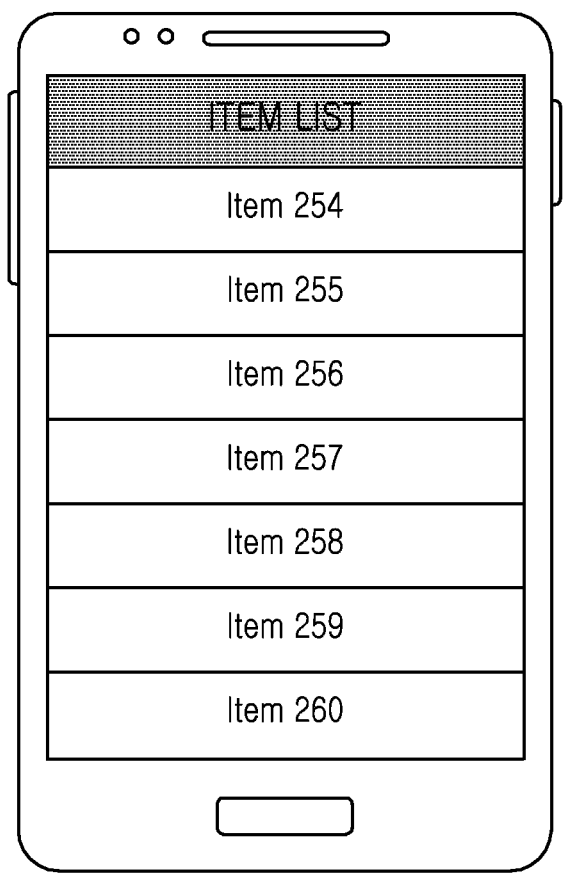

In the case where a drag to the lower or downward direction is detected in the item list of FIG. 16D, the electronic device may change the item list displayed on the display unit 152 to the upper direction by 30 predetermined units depending on object movement interval information corresponding to the drag to the lower or downward direction. Accordingly, the electronic device may display the changed item list on the display unit 152 as illustrated in FIG. 16E.

In the above embodiment, the electronic device may change a page of contents displayed on the display unit 152 to display the item list depending on an object movement interval corresponding to a drag direction.

In another embodiment, the electronic device may change a page of contents displayed on the display unit 152 by an object movement interval corresponding to a drag direction. For example, in the case where an object movement interval is 100 predetermined units, the electronic device may change contents displayed on the display unit 152 by 100 pages.

As described above, an electronic device having a touchscreen may easily edit an object list in a limited display space according to a user's intention by adaptively changing the position of an object depending on the characteristic of a position movement event.

The above-described embodiments of the present disclosure can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof. Specifically, it should be noted that the movement intervals, drag angles, directions and movement interval units described herein are merely exemplary and may be varied in accordance with the spirit and scope of this invention.

What is claimed is:

1. A method in an electronic device, the method comprising:
   when a first event occurs depending on detected touch information of at least one object among a plurality of objects displayed on a display unit, determining a movement interval of a predetermined quantity of units corresponding to a characteristic of the first event; and
   changing a position of the at least one object depending on the movement interval corresponding to the characteristic of the first event,
   wherein the determining of the movement interval comprises:
   (i) detecting whether a touch occurred:
   (ii) when detecting that a touch has occurred, determining a touch frequency of the at least one object detected for a predetermined reference time, and a corresponding movement interval of a respective predetermined quantity of units mapped to the touch frequency.

2. The method of claim 1, further comprising:
   when a second event occurs before the first event occurs, switching to an object edit mode;
   determining a position change direction of an object; and
   determining whether the first event occurs depending on touch information of the at least one object among the objects displayed on the display unit.

3. The method of claim 1, wherein the determining of the movement interval comprises:
   when the first event occurs depending on the touch information of the at least one object among the objects displayed on the display unit, determining the movement interval and a position change direction of an object depending on the characteristic of the first event.

4. The method of claim 1, wherein the determining of the movement interval comprises detecting that the touch has occurred:
   determining a touch maintain time of the at least one object; and
   mapping the respective predetermined quantity of units to the touch maintain time.

5. The method of claim 1, further comprising:
   after determining the movement interval corresponding to a characteristic of the first event, displaying a preview screen for changing a position of the at least one object depending on a corresponding movement interval on the display unit.

6. The method of claim 5, wherein the displaying of the preview screen comprises:
   after determining a movement interval corresponding to a characteristic of the first event with consideration of a drag direction of the at least one object, displaying the preview screen on the display unit with consideration of the drag direction of the at least one object.

7. The method of claim 5, further comprising:
   after displaying the preview screen, determining an initial display direction of the display unit;
   determining if the initial display direction of the display unit changes; and
   changing at least one of a shape and a position of the preview screen on the corresponding to a changed object display direction.

8. The method of claim 5, wherein changing the position of the object comprises:
   after displaying the preview screen, when a touch of the at least one object is released, changing a position of the at least one object depending on a movement interval corresponding to a characteristic of the first event.

9. An electronic device comprising:
   a touchscreen; and
   at least one processor,
   wherein when a first event occurs depending on detected touch information of at least one object among a plurality of objects displayed on the touchscreen, the processor determines a movement interval depending on whether a characteristic of the first event comprises a touch or a drag event, and changes a position of the at least one object depending on the movement interval of a predetermined quantity of units corresponding to the characteristic of the first event, and wherein when the processor determines the touch event has occurred, the processor determines a touch frequency of the at least one object detected for a predetermined reference time, and determines a corresponding movement interval of a respective predetermined quantity of units mapped to the touch frequency.

10. The electronic device of claim 9, wherein when a second event occurs, the processor switches to an object edit mode, determines a position change direction of an object, and determines whether the first event occurs depending on touch information of the at least one object among the objects displayed on the touchscreen.

11. The electronic device of claim 9, wherein when the first event occurs depending on the touch information of the at least one object among the objects displayed on the touchscreen, the processor determines a movement interval of a respective predetermined quantity of units and a position change direction of an object depending on characteristic of the first event.

12. The electronic device of claim 9, wherein when the drag event has occurred, the processor determines a drag direction of the at least one object, and determines the corresponding movement interval of a respective predetermined quantity of units mapped to the drag direction.

13. The electronic device of claim 9, wherein when the drag event has occurred, the processor determines a drag distance of the at least one object, and determines the movement interval of a respective predetermined quantity of units mapped to the drag distance.

14. The electronic device of claim 9, wherein when detecting a touch of the at least one object among the objects displayed on the touchscreen, the processor determines a touch maintain time of the at least one object, and determines the corresponding movement interval of a respective predetermined quantity of units mapped to the touch maintain time.

15. The electronic device of claim 9, wherein when the drag event has occurred, the processor determines a drag region of the at least one object, determines a corresponding movement interval of a respective predetermined quantity of units mapped to the drag region, and determines a position change direction of the object with consideration of a drag direction of the drag region.

16. The electronic device of claim 9, wherein when the drag event has occurred, the processor determines a drag angle of the at least one object based on a reference angle, and determines the corresponding movement interval of a respective predetermined quantity of units and a position change direction of the at least one object with consideration of the drag angle of the at least one object.

17. The electronic device of claim 9, wherein after determining the corresponding movement interval, the at least one processor controls to display a preview screen for changing a position of the at least one object on the touchscreen.

18. The electronic device of claim 17, wherein when determining the corresponding movement interval of a respective predetermined quantity of units with consideration of a drag direction of the at least one object, the at least one processor controls display of the preview screen on the touchscreen with consideration of the drag direction of the at least one object.

19. The electronic device of claim 17, wherein after displaying the preview screen, the processor determines based on an initial display direction of the touchscreen, if an initial display direction changes, and when the initial display direction of the touchscreen changes, the at least one processor changes at least one of a shape and a position of the preview screen on the touchscreen corresponding to depending on the changed display direction.

20. The electronic device of claim 17, wherein after displaying the preview screen, when a touch of the at least one object is released, a program changes a position of the at least one object depending on a movement interval of a respective predetermined quantity of units corresponding to a characteristic of the first event.

21. A method for editing an object in an electronic device, the method comprising:
    displaying a plurality of objects on a display unit;
    detecting a position movement event for at least one object among the plurality of objects;
    selecting the at least one object in a position the position movement event is detected;
    detecting a movement of the position movement event;
    determining a characteristic of the position movement event;
    determining a predefined movement interval for the characteristic of the position movement event; and
    changing a position of the at least one selected object to jump by the determined predefined movement interval,
    wherein the determining of the predefined movement interval comprises:
    when detecting a touch selection of the at least one object among the objects displayed on the display unit, determining a touch frequency of the at least one object detected for a predetermined reference time; and
    determining a corresponding movement interval of a respective predetermined quantity of units mapped to the touch frequency.

22. An electronic device comprising:
    a touchscreen configured to display a plurality of object; and
    a processor configured to:
        detect a position movement event for at least one object among the plurality of objects,
        select the at least one object in a position the position movement event is detected,
        detect a movement of the position movement event,
        determine a characteristic of the position movement event,
        determine a predefined movement interval for the characteristic of the position movement event, and
        change a position of the selected object to jump by the determined predefined movement interval,
    wherein when detecting a touch selection of the at least one object among the objects displayed on the touchscreen, the processor determines a touch frequency of the at least one object detected for a predetermined reference time, and determines a corresponding movement interval of a respective predetermined quantity of units mapped to the touch frequency.

* * * * *